United States Patent [19]
Ohta et al.

[11] Patent Number: 5,982,301
[45] Date of Patent: *Nov. 9, 1999

[54] NAVIGATION APPARATUS

[75] Inventors: Masako Ohta; Hisatsugu Itoh; Hiroaki Ideno; Masatsugu Norimoto, all of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/591,395

[22] Filed: Jan. 25, 1996

Related U.S. Application Data

[63] Continuation-in-part of application No. 08/547,775, Oct. 25, 1995, abandoned.

[30] Foreign Application Priority Data

Jan. 20, 1995 [JP] Japan .................................. 7-007786
Dec. 18, 1995 [JP] Japan .................................. 7-329307

[51] Int. Cl.⁶ .................................................. G08G 1/123
[52] U.S. Cl. .......................... 340/995; 340/990; 340/988; 701/210
[58] Field of Search .................................. 340/995, 988, 340/990; 364/444, 449; 701/210, 211

[56] References Cited

U.S. PATENT DOCUMENTS

| | | | |
|---|---|---|---|
| 4,677,450 | 6/1987 | Ito et al. | 364/449 |
| 4,897,792 | 1/1990 | Hosoi | 364/449 |
| 4,926,336 | 5/1990 | Yamada | 364/444 |
| 4,954,959 | 9/1990 | Moroto et al. | 364/449 |
| 5,036,471 | 7/1991 | Tamura et al. | 364/449 |
| 5,093,669 | 3/1992 | Kajiyama | 342/457 |
| 5,117,363 | 5/1992 | Akiyama et al. | 364/449 |
| 5,168,452 | 12/1992 | Yamada et al. | 364/444 |
| 5,323,152 | 6/1994 | Morita | 340/988 |
| 5,343,399 | 8/1994 | Yokoyama et al. | 364/449 |
| 5,369,588 | 11/1994 | Hayami et al. | 364/449 |
| 5,434,591 | 7/1995 | Goto et al. | 340/995 |
| 5,471,205 | 11/1995 | Izawa | 340/995 |
| 5,539,429 | 7/1996 | Yano et al. | 340/995 |
| 5,614,898 | 3/1997 | Kamiya et al. | 340/990 |
| 5,638,279 | 6/1997 | Kishi et al. | 340/990 |
| 5,736,941 | 4/1998 | Schulte et al. | 340/988 |

*Primary Examiner*—Brent A. Swarthout
*Assistant Examiner*—John Tweel, Jr.
*Attorney, Agent, or Firm*—Sughrue, Mion, Zinn, Macpeak & Seas, PLLC

[57] ABSTRACT

A navigation apparatus capable of outputting the guide information concerning a necessary point input by a driver in response to a request of the driver previously stores map information, specifies an automobile position on the map information by detecting signals such as GPS signals, gyroscopic signals and speed pulse signals, etc., retrieves a point to be guided from the map information on the basis of the present position of the automobile, produces the guide information concerning the point to be guided by processing the map information, and displays the guide information concerning the point to be guided. Further, a guide switch (a touch panel key) as a display mark, a distance to a target destination point and an azimuth toward the target destination point, and a running direction to go at or near the target destination point are also displayed.

18 Claims, 26 Drawing Sheets

ONE LINK DATA

ONE NODE DATUM

FIG. 12

| CLAUSE CODE | CONTENTS OF VOICE WAVEFORMS |
|---|---|
| 0101 | " ABOUT ONE KILOMETER OFF " |
| 0102 | " ABOUT TWO KILOMETERS OFF " |
| 0103 | " ABOUT THREE KILOMETERS OFF " |
| ⋮ | |
| 0110 | " ABOUT TEN KILOMETERS OFF " |
| ⋮ | |
| 0201 | " TO RIGHT DIRECTION " |
| 0202 | " TO LEFT DIRECTION " |
| 0203 | " TO STRAIGHT DIRECTION " |
| ⋮ | ⋮ |

NAVIGATION APPARATUS

This is a Continuation-in-Part of application Ser. No. 08/547,775 filed Oct. 25, 1995 now abandoned.

BACKGROUND OF THE INVENTION

1. Field of the Invention

This invention relates to a navigation apparatus for generating and providing a guide information about a target destination point to a driver of an automobile or a car by means of either or both of a voice on a speaker and a display on a screen while the automobile incorporating the navigation apparatus is in motion, and more particularly relates to a navigation apparatus which is capable of generating and providing generated guide information to a driver by means of a display based on the driver's request.

2. Description of the Prior Art

A conventional navigation apparatus detects when an automobile having the navigation apparatus becomes within a specified range of an intersection, and then informs the driver of an advancing direction to take at the intersection by means of a voice, or a voice and a visual display, as disclosed in Japanese Published Un-examined Patent Application (or in Japanese Laid Open Patent Un-examined Application) No. 202307/85 (Tokkai-Sho 60-202307).

Since the conventional navigation apparatus provides guide information to the driver independently from the driver's request or the driver's will by means of the conventional navigation system while the automobile is running, the driver does not always obtain guide information when the driver wants to get it. For example, since the guide information concerning an intersection is not provided to the driver until the automobile is close to the intersection, it is often difficult for the driver to make advance decision. If guide information is provided every specified distance or every specified time so as to solve the aforementioned problem, the driver can become annoyed and unnecessarily stressed because he hears the guide information even when he does not want it. That is to say, since the conventional navigation apparatus supplies the guide information to the driver regardless of his will, there is a problem that the driver must wait to get the guide information until the conventional navigation apparatus incorporated in the automobile provides the guide information to the drive even if the driver wants to hear the guide information.

In order to solve the conventional problem described above, another conventional navigation apparatus, for example which is disclosed in Japanese Published Laid Open Un-examined Patent Application No. 99678/93 (Tokkai-Hei 5-99678), is constructed so as to output guide information along a predetermined route by means of a voice in response to the manipulation of a driver when requested. But, since the amount of information which can be expressed by voice is relatively small, the conventional navigation apparatus has a drawback in that it cannot always supply the guide information to the driver when the driver wants precise and detailed guide information. For example, this conventional navigation apparatus has the following drawback:

Although the conventional navigation apparatus can provide guide information about a road intersection to a driver, the guide information provided by the conventional navigation apparatus typically only includes simple directions such as "Turn to the right" or "Turn to the left" by means of a voice about a point where there is the road intersecting to which several roads having oblique angles are gathered. However where there are a plurality of roads with a similar azimuth toward which the automobile having the conventional navigation apparatus can enter, it is difficult for the driver to select the road and the driver will often be at a loss to determine which road to enter.

In addition, the guide information which drivers typically want is not only a direction to turn to the right or the left, but also includes various guide information items such as a name of a point, the existence of a facility or the like on a road side by which the driver can specify the point, and the name and route number of a road to enter. Consequently, there is also a problem that it is not sufficient to supply a guide information to the driver only by means of a voice based on a driver's request.

SUMMARY OF THE INVENTION

In view of the foregoing drawbacks included in the conventional navigation apparatus described above, it is an object of the present invention to provide a navigation apparatus which is capable of generating and outputting guide information concerning points to a driver in response to the driver's request.

It is another object of the present invention to provide a navigation apparatus which is capable of generating and providing guide information which is easy to understand and to recognize for a driver and capable of decreasing driver misreads of the generated guide information.

It is a further object of the present invention to provide a navigation apparatus which is capable of decreasing the required memory area in a memory in which guide information items are stored as map information without significantly reducing the ability of the navigation to provide many types of the guide information items.

According to the first aspect of the present invention for achieving the above-mentioned objects, there is provided a navigation apparatus comprising a map information storing means for storing map information, a present position detecting means for specifying a present position of an automobile on the map information by detecting a signal such as a GPS signal, a gyroscopic signal, and a speed pulse signal provided from the automobile, a map information retrieving means for retrieving a point to be guided from the map information stored in the map information storing means on a basis of the present position of the automobile, a guide information processing means for producing guide information concerning the point to be guided by processing the map information stored in the map information storing means, a displaying means for displaying the guide information concerning the point to be guided, and an inputting means for inputting various inputs including an input for the guide information in response to a driver's request.

As stated above, the navigation apparatus according to the first aspect of the present invention retrieves a point to be guided from map information stored in the map information storing means on a basis of a present position of an automobile provided with the apparatus, and produces the guide information concerning the point to be guided by processing the map information stored in the map information storing means for displaying the guide information in response to a driver's request input by means of the inputting means. Consequently, the navigation apparatus can display the guide information concerning a requested point ahead of time in addition to the guide information concerning the present position of the automobile.

According to the second aspect of the present invention, there is provided a navigation apparatus comprising a route setting means for determining a travel route to a destination input by means of an inputting means, and a map information retrieving means retrieves guide information concerning points to be guided along a route determined by the route setting means from map information stored in a map information storing means.

As stated above, in the navigation apparatus according to the second aspect of the present invention, the map information retrieving means retrieves the guide information concerning the points to be guided along the route determined by the route setting means from map information stored in the map information storing means to generate the guide information for display in response to a driver's request input. Consequently, the navigation apparatus can display the guide information concerning a requested point along the route ahead of time in addition to the guide information concerning the present position of the automobile.

According to the third aspect of the present invention, there is provided a navigation apparatus for displaying guide information relating to a point to be guided such as information relating to a road intersection where an automobile having the navigation apparatus will meet when the automobile goes along the present route thereof.

As stated above, the navigation apparatus according to the third aspect of the present invention retrieves information of a guidance point relating to a road intersection ahead of the automobile having the navigation apparatus from stored map information based on a present position of the automobile, and generates guide information relating to the guidance point by processing the stored map information to display the guide information in response to a driver's request transmitted from an inputting means. Consequently, the navigation apparatus can display the guide information relating to a road intersection as the requested point ahead of time in addition to the guide information concerning the present position of the automobile.

According to the fourth aspect of the present invention, there is provided a navigation apparatus comprising a voice outputting means for outputting voice guide information, and a guide information processing means for executing a process that allows the voice outputting means to output voice guide information related to the guide information displayed on the displaying means at the same time.

As stated above, in the navigation apparatus according to the fourth aspect of the present invention, related guide information can be both displayed unannounced at the same time, in accordance with the content of the guide information. Thereby, the driver can recognize easily the guide information provided from the navigation apparatus.

According to the fifth aspect of the present invention, there is provided a navigation apparatus which generates and provides map information such as network information expressing at least relationships of roads connected to each other by links and nodes. The network information is used to generate and display corresponding graphics.

As stated above, the navigation apparatus according to the fifth aspect of the present invention generates and describes the map information as network information expressing at least relationships of roads connected to each other by links and nodes on the displaying means. Consequently, the amount of information to be stored in the map information storing means can be decreased, and graphic information that is generated on a basis of the network information is displayed on the displaying means as guide information. Thereby, the driver can recognize complicated guide information and the relationship between them quickly and easily, and the chance that a driver misreads generated information it can be decreased.

According to the sixth aspect of the present invention, there is provided the navigation apparatus further comprising target destination guide information displaying means for generating guide information items from the present position of the automobile to or toward the target destination point and at or near the target destination point and for displaying the generated guide information items by the displaying means.

As stated above, because the navigation apparatus of the sixth aspect of the present invention further comprises the target destination guide information display means for generating the guide information about items from the present position of the automobile to or toward the target destination point and at or near the target destination point, and for providing them to the displaying means, there is an effect that the driver of the automobile can recognize the rough and effective guide information items such as the distance to the target destination point and the azimuth toward the target destination point and the running direction to go to or near the target destination point when the driver requires no detailed guide information.

BRIEF DESCRIPTION OF THE DRAWINGS

Further objects and advantages of the present invention can be more fully understood from the following detailed description taken in conjunction with the accompanying drawings, in which:

FIG. 12 is an explanatory diagram showing the relationships between input codes and output voices in the voice outputting means of the navigation apparatus of the embodiment 3;

DETAILED DESCRIPTION OF THE PREFERRED EMBODIMENTS

Preferred embodiments of the present invention will now be described in detail with reference to the accompanying drawings.

Embodiment 1

Figure 1:
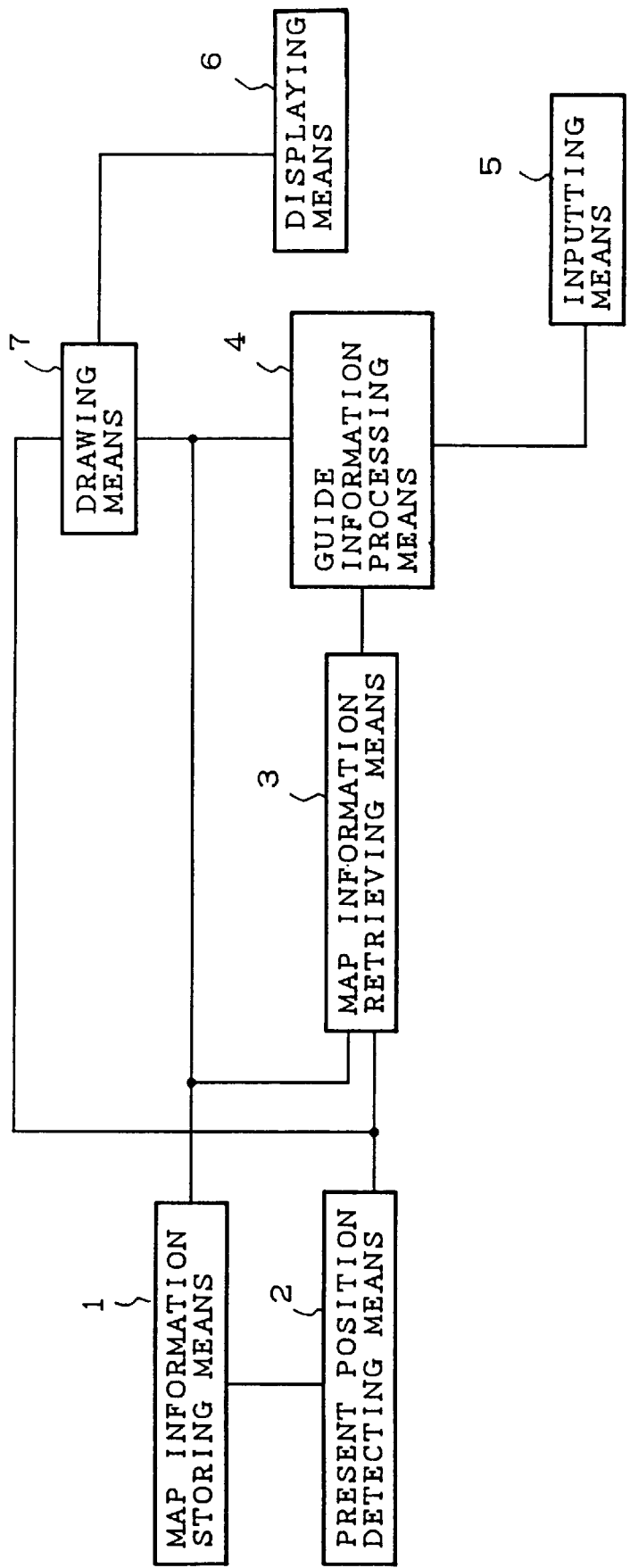
FIG. 1 is a block diagram showing the system configuration of a navigation apparatus according to a first embodiment (embodiment 1) of the present invention.

FIG. 1 is a block diagram showing an example of the system construction of a navigation apparatus according to the present invention. In the figure, a reference numeral 1 denotes a map information storing means, which can concretely be various kinds of recording media capable of recording a lot of data such as a CD-ROM (having recorded map information and a CD-ROM driver for reading data out of the CD-ROM, a hard disk device, a photo-magnetic disk device, an IC card using a semiconductor memory, etc. A reference numeral 2 denotes a present position detecting means having a function of obtaining position coordinates where an automobile exists by operating on the basis of a travelling locus and so forth which is obtained on the basis of a moved distance and an azimuth of an automobile; the moved distance is computed from a longitude and latitude of the automobile computed from at least radio wave signals from a GPS satellite, an automobile speed, wheel revolutions of tires of the automobile, and the like, and the azimuth of the automobile is computed from a signal from an angular velocity sensor or a magnetic sensor such as a vibrating gyroscope, an optical fiber gyroscope, etc. Moreover, it can be acceptable for the present position detecting means 2 to include a map matching means for determining the most trustworthy point on map data by comparing map data stored in the map information storing means 1 with the position coordinates of the automobile for improving reliability. All of those techniques are well known by a person having ordinary skill in the art to which the navigation apparatus pertains, and therefore the subject matter of the present invention does not matter what the position detecting means 2 is. A reference numeral 3 denotes a map information retrieving means for retrieving a point to be guided from map information; a reference numeral 4 denotes a guide information processing means for generating guide information on an output from the map information retrieving means 3 and the information stored in the map information storing means 1 to display the guide information on the displaying means 6 in response to a driver's request input from the inputting means 5.

A hard key switch or a touch panel switch incorporated in the displaying means 6 can be used as the inputting means 5. Furthermore, a voice recognizing device, which performs an inputting operation for input of a driver's request by converting direction voice from the driver into electrical signals which is equal to the hard key switch and the like in function, can attain the same effects equivalent to those in case of using the hard key switch. A picture displaying device such as a CRT (Cathode Ray Tube) device, a LCD (Liquid Crystal Display), or the like which is ordinarily used as a displaying terminal of a navigation apparatus satisfies the conditions of the displaying means 6 of the present invention.

The details of the map information stored in the map information storing means 1 will now be described for the sake of the detailed description of the operation of the map information retrieving means 3 and the guide information processing means 4.

Figure 2:
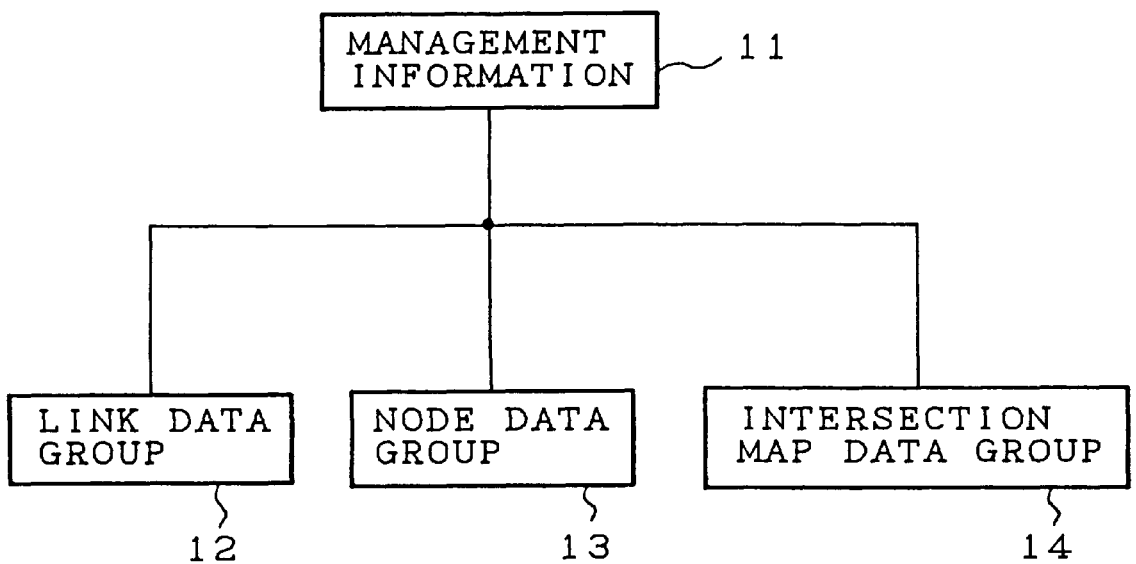
FIG. 2 is a block diagram showing the principal part in the whole construction of the map information in the navigation apparatus of the embodiment 1.

FIG. 2 is a block diagram showing a main part of the map information. In the figure, a reference numeral 11 denotes management information for indicating the existence of individual information constituting the map information; the management information 11 is the information essential for the map information retrieving means 3 and the guide information processing means 4 to access individual map information. But, since the management information 11 does not contribute to the effect of the present invention directly, and usually exists in the construction of this kind of database, the details of the management information 11 is not described here, and further processes of using the managing information 11 at the time of accessing individual information in an operation from now on will be omitted from the description. A reference numeral 12 denotes a link data group for the description of the information regarding road intercepts of a road network. A reference numeral 13 denotes a node data group for the description of the information concerning the nodes of the road network. A reference numeral 14 denotes an intersection map data group, which will be described later.

Figure 3:
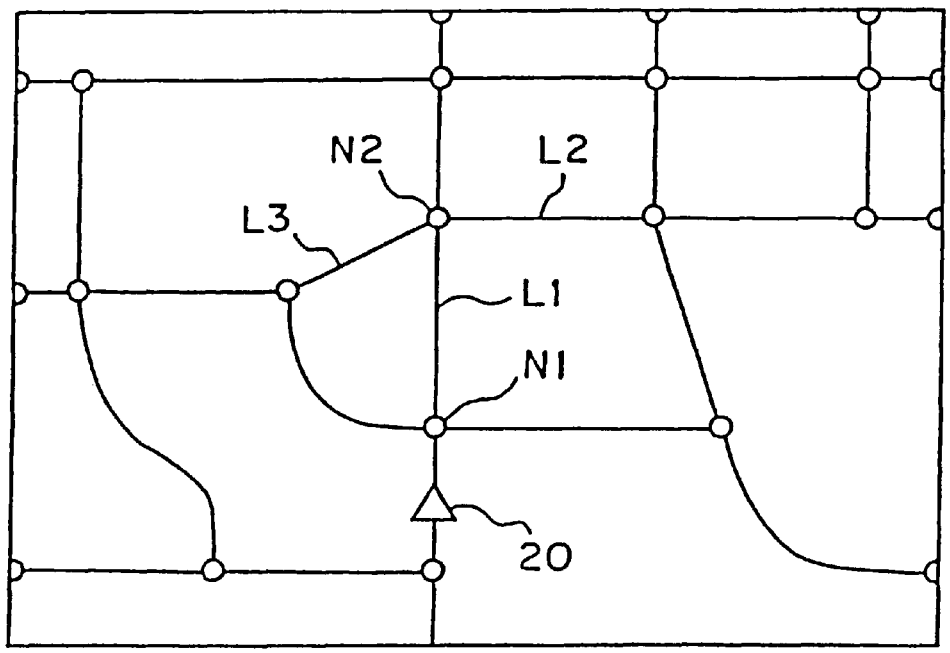
FIG. 3 is a network map showing a road network in the navigation apparatus of the embodiment 1.

FIG. 3 shows an example of a road network for the description of the operation of the present invention. Circles marked with reference letters such as N1, N2, etc. denote road intersections (or intersections), and are expressed as nodes in the aforementioned map information. Lines marked with reference letters L1, L2, L3, etc. denote road intercepts between road intersections, and are expressed as links in the aforementioned map information. A reference numeral 20 denotes a present position of an automobile provided with the navigation apparatus.

Figure 4A:
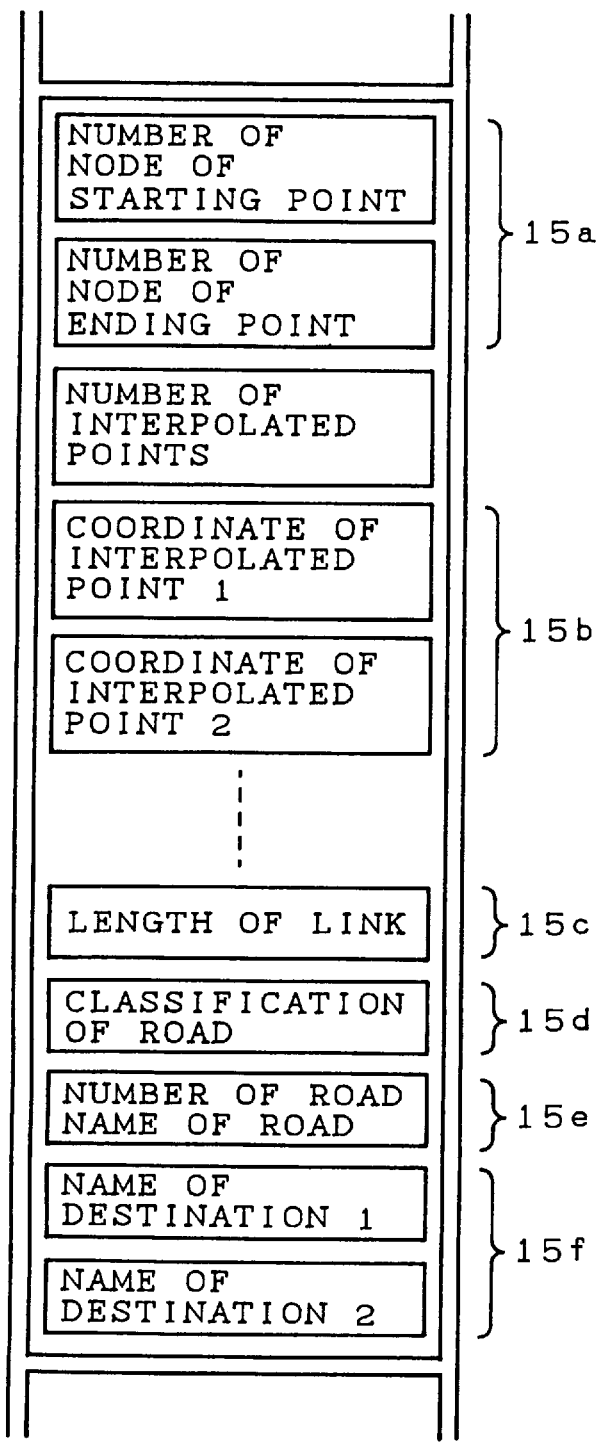
FIG. 4A and FIG. 4B are explanatory diagrams showing the details of the map information in the navigation apparatus of the embodiment 1.
Figure 4B:
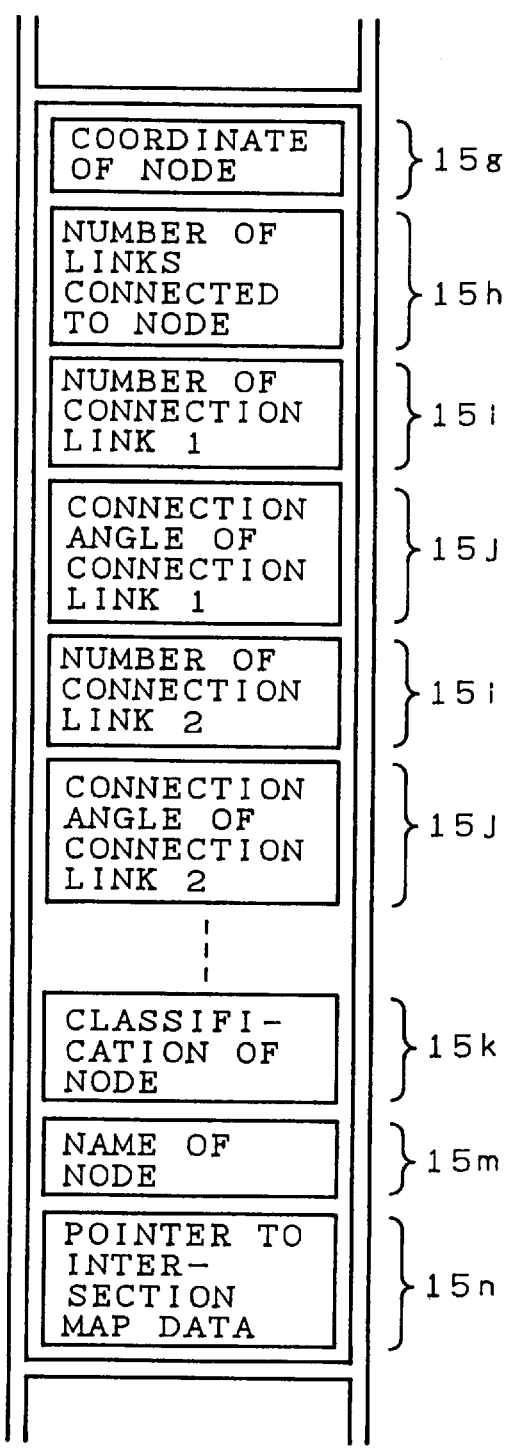

FIG. 4A and FIG. 4B are explanatory diagrams showing the details of a link datum and a node datum respectively. A link datum, as shown in FIG. 4A, comprises numbers 15a of nodes forming both the ends of the link, coordinates of interpolated points 15b for the expression of the shape of the road with polygonal lines, the length of the link 15c, the classification of the road 15d indicating the management classification of the road such as a national road, a prefectural road, etc., the management number and the proper name of the road 15e, names of target destinations 15f (or names of destinations) being the place names indicating where the automobile will arrive if the automobile advances along the road, and the like. Other data such as the classification of a link indicating whether the road is a main track or a side track, width data indicating the width of the road or the number of traffic lanes where an automobile can run, traffic regulation data such as one-way traffic, etc. may be stored as occasion demands. A node datum, as shown in FIG. 4B, comprises the position coordinate of the node 15g, the number of links connected to the node 15h, the numbers of each link 15i, link connection angles 15j formed by the connection of links to the node, the classification of a node 15k indicating whether the node is an intersection or a branch point, and the like, the name of the intersection 15m indicated by the node, and further a pointer 15n to intersection map data which is proper to the present embodiment. The data of the intersection map data group 14 are picture data expressing the detailed shape of an intersection corresponding to a node or facilities around the intersection in a form of picture information, and the pointer to the intersection map data 15n indicates the position of an intersection map datum corresponding to a node among the intersection map data group 14.

It will be described in conjunction with the flow chart of FIG. 5 how the map information retrieving means 3 selects a point to be guided from such map information. Hereinafter, a process for realizing a function of selecting an intersection where a main road (national road in this case) intersects in front of an automobile provided with the navigation apparatus or where there is no road on which an automobile can go straight will be described.

At first, the map information retrieving means 3 obtains the number of the link where the position of an automobile provided with the navigation apparatus exists from the present position detecting means 2 to examine whether the obtained number has been updated by comparing it with the last link number of the automobile position (step ST100). If the number has not been updated, the map information retrieving means 3 waits until the number changes, and if the number has been updated, the map information retrieving means 3 obtains the number of the link where the automobile position exists and the advancing direction from the present position detecting means 2 (step ST101).

Next, the map information retrieving means 3 sets the obtained link as an entered link, and obtains the node data at the end of the entered link on the advancing direction side of the automobile (step ST102). Then, the map information retrieving means 3 obtains connected link data other than the entered link from the connected link number described in the node data to obtain road classifications of each link, and examines whether a link of a national road exists in the direction intersecting the entered link or not (step ST103). If the link of a national road exists, the map information retrieving means 3 outputs the node to the guide information processing means 4 as a point to be guided (step ST108). If the link of a national road does not exist, the retrieving means 3 examines whether a link along which an automobile can flow out exists or not within a predetermined angle ahead of the automobile in the advancing direction among the links connected to the node except for the entered link (step ST104). If there is no link where the automobile can flow out within the predetermined angle, the map information retrieving means 3 regards the node as a point where there is no road along which the automobile can go straight and the driver must perform some driving operation, and outputs the node as a point to be guided (step ST108). If there is a link where the automobile can flow out, the map information retrieving means 3 sets the link as an entered link to be examined next time (step ST105). If the distance integrated from the present position up to the node ahead of the entered link exceeds a predetermined range of distance (step ST106), the map information retrieving means 3 ends the retrieval because the automobile has reached the upper limit of retrieving distance, and outputs a signal indicating that there is no point to be guided (step ST107). If the automobile has not reached the upper limit of retrieving distance, the map information retrieving means 3 returns to the step ST102, and repeats the retrieval of links ahead of the automobile position. When the map information retrieving means 3 finishes the step ST107 or the step ST108, it returns to the step ST100 and waits the updating of the link at the automobile position.

At the step ST108, the map information retrieving means 3 outputs an entering angle from the automobile position to the node, the number of the entered link, the distance up to the node, or the like in addition to the node number of the point to be guided (it is supposed that the aforementioned information is also output to the guide information processing means 4 in the following description). The entering angle can be obtained from a link connecting angle existing in link data, and the distance up to the node can be obtained by integrating a link distance existing in the link data.

Figure 6A:
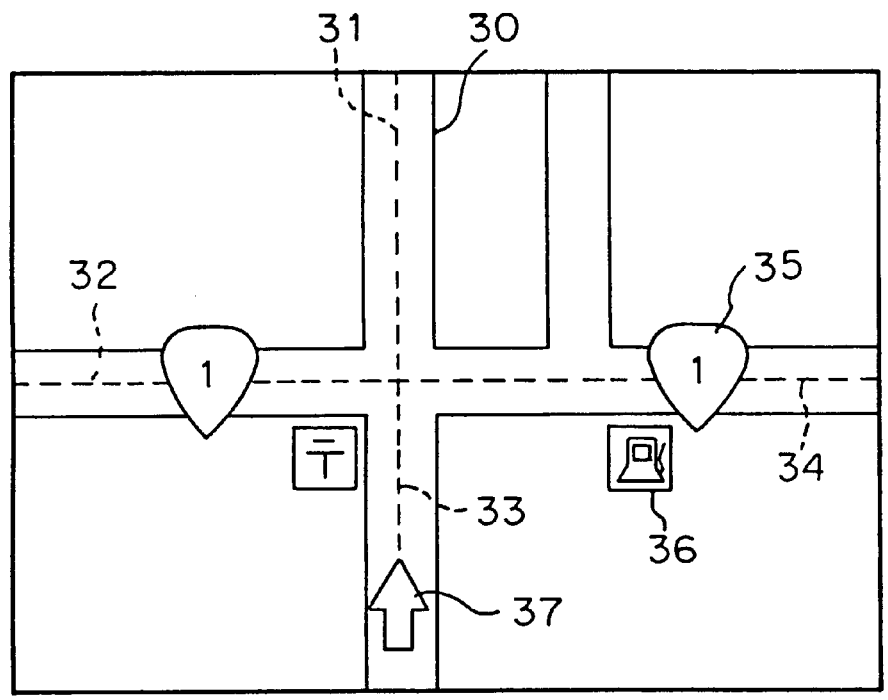
FIG. 6A and FIG. 6B are road intersection maps showing road intersections to be displayed by a navigation apparatus according to a second embodiment (embodiment 2) and a third embodiment (embodiment 3) of the present invention, respectively.
Figure 6B:
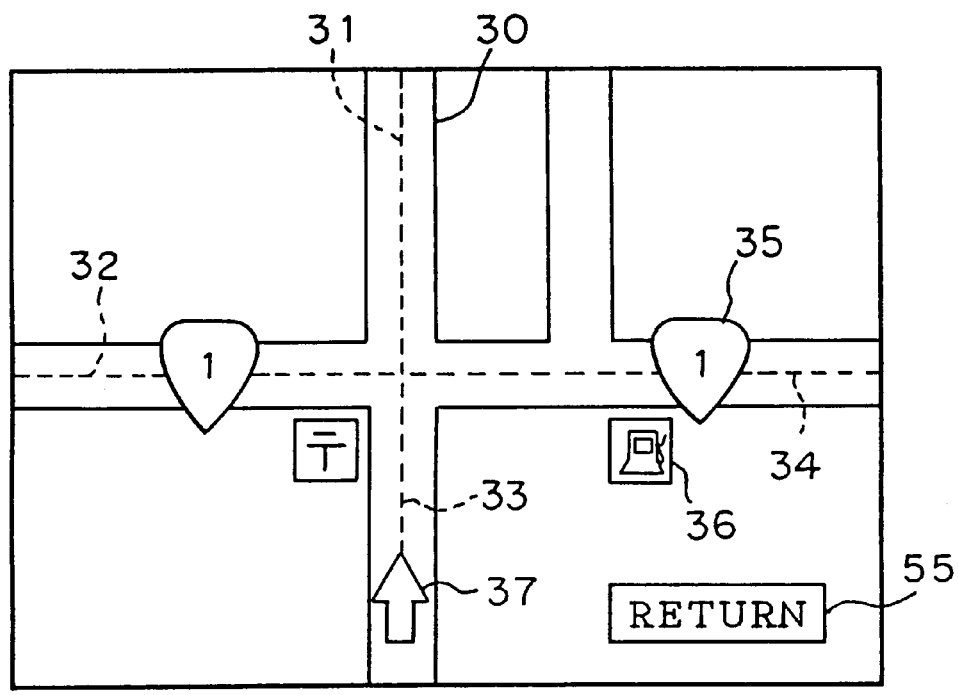

Next, it will be described how the guide information processing means 4 displays guide information on the displaying means 6 concerning the point to be guided determined by the map information retrieving means 3. In this description, the case of displaying an enlarged map of an intersection shown in FIG. 6 on the displaying means 6 is described as an example. In FIGS. 6A and 6B, a reference numeral 30 denotes a border line of a road. Reference numerals 31–34 denote center lines of roads which are drawn in intercepts of roads the links of which are defined in the road network data shown in FIG. 4A and FIG. 4B. A reference numeral 35 denotes a mark of a road number. A reference numeral 36 denotes a symbol indicating a facility on a road. A reference numeral 37 denotes a mark indicating an entering direction of an automobile provided with the navigation apparatus. A reference numeral 38 (FIG. 8) denotes a display mark indicating the existence of information which can be informed in the system.

Figure 7:
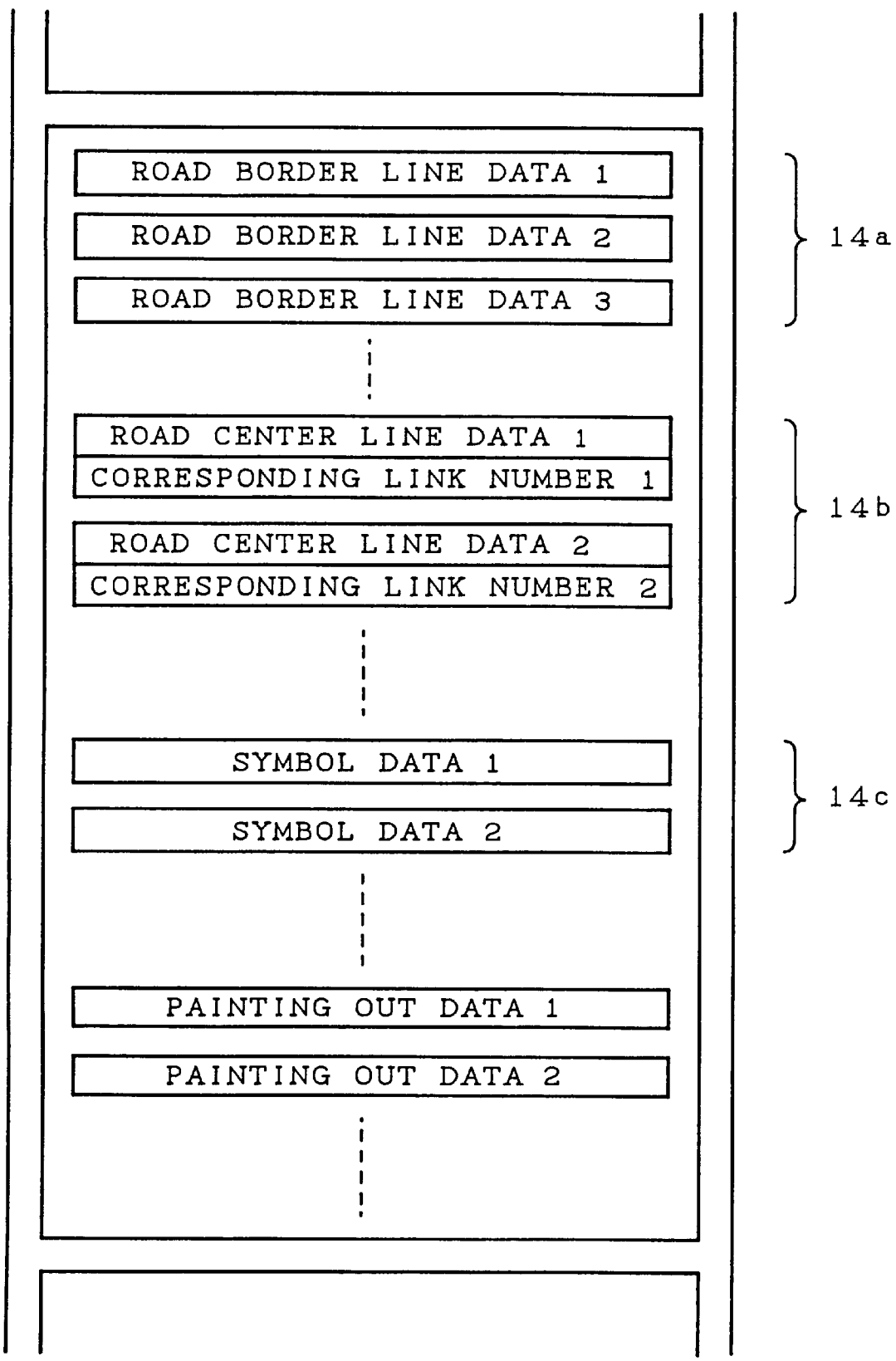
FIG. 7 is an explanatory diagram showing road intersection data for drawing the road intersection maps as shown in FIGS. 6A and 6B.

FIG. 7 shows the content of the intersection map data group 14 shown in FIG. 2; the content includes picture drawing information for drawing such an enlarged map of an intersection as shown in FIG. 6A. The road border line data 14a are a full line data group for drawing the road border lines 30. The road center line data 14b are a dotted line data group for drawing the road center lines 31–34; coupled link numbers corresponding to road intercepts are stored as the road center line data 14b. The symbol data 14c have font patterns for drawing the road number marks 35 and the facility symbols 36 and display center coordinate data indicating positions to draw them.

Figure 8:
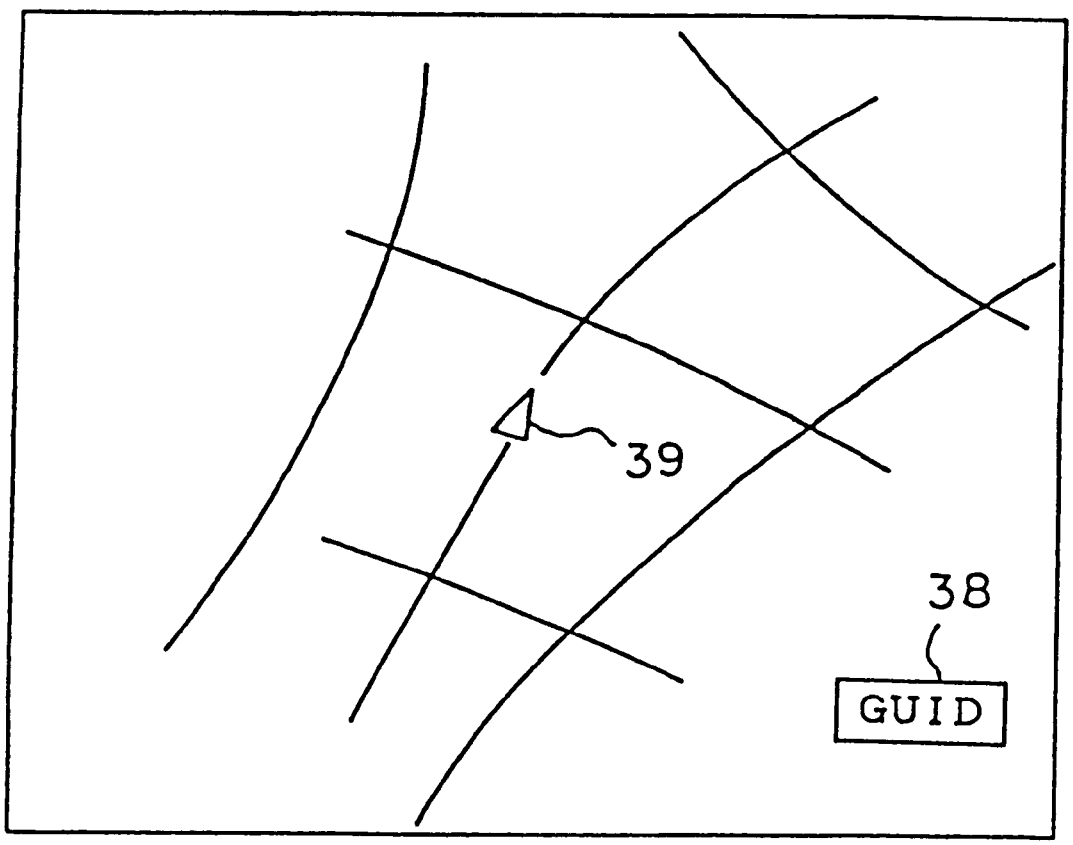
FIG. 8 is an explanatory diagram of a map ordinarily displayed by the navigation apparatus of the embodiment 1.

FIG. 8 is an explanatory diagram showing an example of the operation of a system of the navigation apparatus to which the embodiment of the present invention is applied. The displaying means 6 displays the map around an automobile provided with the navigation apparatus together with the automobile position mark 39. The display of the automobile position mark 39 and the background map is realized by drawing them in a frame memory in the drawing means 7 shown in FIG. 1 by the drawing means 7 by means of the map information stored in the map information storing means 1, a present position coordinate detected by the present position detecting means 2, and the like and by transmitting them to the displaying means 6 as picture signals. It is possible to display guide information in response to the manipulation of a driver by means of the inputting means 5 only when the display mark 38 indicating the existence of the information capable of being informed is displayed. The displaying means 6 may be constructed so that the display mark 38 is only a mark and the inputting means 5 is a hard key switch provided elsewhere, and also may be constructed to use a touch panel inputting device incorporated in the displaying means 6 as the display mark 38 which starts the operation of informing guide information by being touched.

Figure 9:
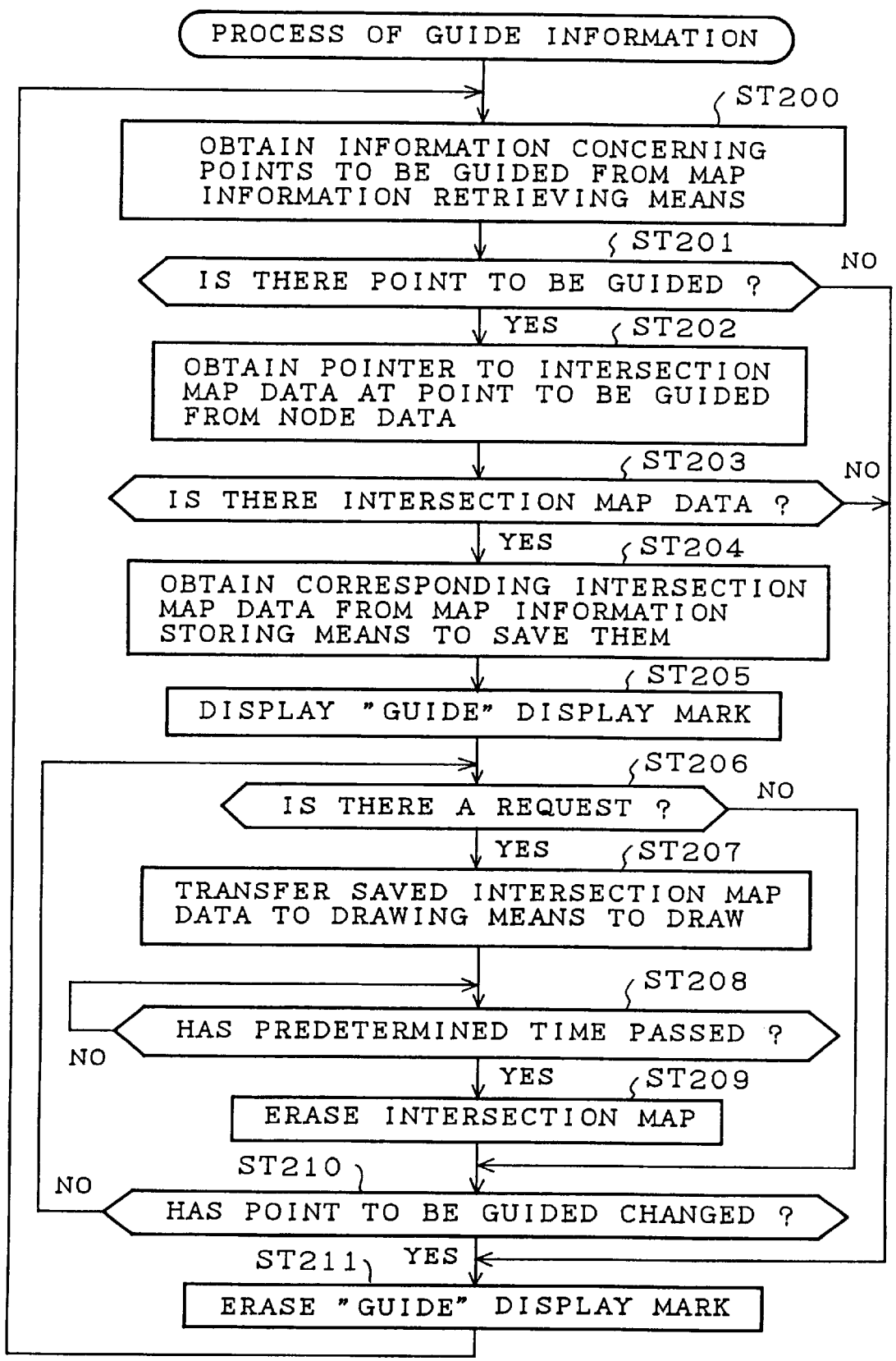
FIG. 9 is a flow chart showing a part of the operation of the navigation apparatus of the embodiment 1.

The flow of processes of the guide information processing means 4 is shown in FIG. 9. At first, the guide information processing means 4 obtains the information concerning points to be guided from the map information retrieving means 3 (step ST200). Since the information concerning points to be guided does not always exist as shown at the step ST107 of FIG. 5, the guide information processing means 4 checks the existence of it (step ST201). If the information does not exist, the guide information processing means 4 goes to the step ST211. If there is a significant point to be guided, the guide information processing means 4 obtains a pointer (shown by reference numeral 15n in FIG. 4B) to the intersection map data described in the node data by means of the node number as a key (step ST202). And then, the guide information processing means 4 checks whether a significant value has been set in the pointer 15n to the intersection map data or not (step ST203). If a significant pointer value has been set, the guide information processing means 4 obtains the intersection map data corresponding to the point to be guided out of the intersection map data group 14 stored in the map information storing means 1 by means of the significant pointer value, and saves the intersection map data in a memory of the guide information processing means 4 for the time being (step ST204). If no significant pointer value has been set, the guide information processing means 4 goes to the ST211 because there are no corresponding intersection map data.

After obtaining the intersection map data, the guide information processing means 4 instructs the drawing means 7 to draw the display mark 38, and enter into the state of waiting a driver's request from the inputting means 5 (step ST206). After receiving a driver's request from the inputting means 5, the guide information processing means 4 transfers the saved intersection map data, an entered link number and an entering angle received from the map information retrieving means 3 to the drawing means 7, and then the drawing means 7 begins to draw an intersection map and display it on the displaying means 6 (step ST207). The operation for drawing of the road intersection map is performed by executing the rotational coordinate transformation of the road border line data 14a, the road center line data 14b, the symbol data 14c, and the like, which are shown in FIG. 7, in order in accordance with the entering angle into the intersection, and by spreading the transformed data over the frame memory in the drawing means 7 at the same time. The rotational coordinate transformation is a procedure for substituting the order of the data of picture information arranged in conformity with a prescribed coordinate system into the order where the entering direction to a road intersection exists at the upper part. After finishing the drawing of the intersection map, the guide information processing means 4 obtains road center line data corresponding to the entered link by investigating corresponding link numbers recorded in a form coupled with the road center line data. And then, the guide information processing means 4 draws the arrow 37 indicating the entered direction shown in FIG. 6A on the center line of the road.

After a predetermined time has passed since a drawn intersection map was displayed on the displaying means 6 (step ST208), the guide information processing means 4 sends an instruction to erase the intersection map to the drawing means 7 (step ST209). When receiving this instruction, the drawing means 7 erases the intersection map which has been displayed until then, and again displays a map picture such as FIG. 8.

Then, the guide information processing means 4 examines the intersection to be guided again (step ST210). When the intersection has not changed, the guide information processing means 4 indicates that the flow returns to the waiting state for a request in the step ST206. If there is no request at the step ST206, the means 4 indicates that the flow goes to the step ST210 to examine only whether or not the place of the road intersection to be guided has been changed or not while the automobile is moving. In the step ST210, when the road intersection to be guided has been changed, the guide information processing means 4 sends an instruction in order to erase the display mark "GUIDE" 38 displayed on the displaying means 6 as shown in FIG.8 to the drawing means 7, and the mark "GUIDE" shown in FIG.8 is erased from the displaying means 6, the flow returns to the step ST200.

Although the net of road intersections displayed on the displaying means 6 shown in FIG. 6A is erased after a predetermined time is elapsed automatically (steps ST208 and ST209), in addition to this function, it can be acceptable to add another function into the guide information processing means 4 and a new touch panel switch "RETURN" 55 as shown in an explanatory diagram of FIG. 6B for example, is displayed as a delete instruction means for erasing the net of the intersections displayed on the displaying means 6 as shown in FIG. 6B. In this case, when the driver touches this new touch panel switch "RETURN" 55 displayed on the displaying means 6, the guide information processing means 4 transfers the instruction to the displaying means 6 in order to erase the net of the intersections from the display, and the displaying means 6 receives this instruction and erases the net of the intersections from the display. Then, the displaying means 6 displays the map shown in FIG. 8, and the flow goes to the step ST210.

Embodiment 2

Figure 10:
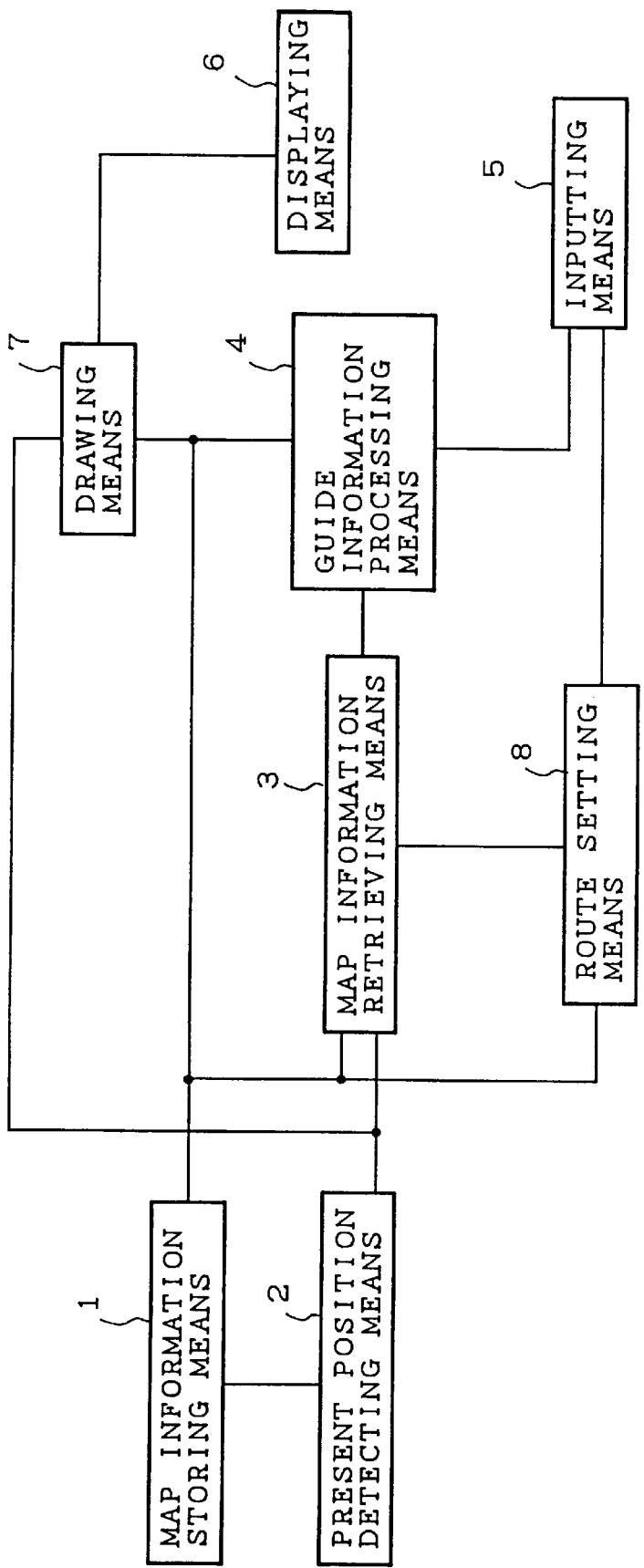
FIG. 10 is a block diagram showing the system configuration of a navigation apparatus according to the embodiment 2.

The navigation apparatus of the embodiment 2 of the present invention, as shown in FIG. 10, has a route setting means 8 in addition to the constructing elements shown in FIG. 1. The route setting means 8 may be constructed to select a road link to a target destination (or a destination) one by one by means of the inputting means 5, or may be constructed so that the a driver sets only a target destination by means of the inputting means 5, and that the optimum route from the present position is computed by the system of the navigation apparatus to be presented. There are many well-known techniques such as Dijkstra method, a well-researched mathematical method of graphical search algorithm, which can be applied to compute the optimum route, and further the method of computing a route is not the subject matter of the present invention. Accordingly, the detailed description thereof is omitted. The description will be done to the case where guide information concerning an intersection having a road to turn to the right or the left ahead of an automobile on a route is informed, on the assumption that route data computed as a link train continuing from the stating point (present point) to the target destination in a road network shown in FIG. 3 are transferred to the map information retrieving means 3. In the present embodiment, this operation is realized only when an automobile position exists on a route set by means of the route setting means.

Figure 5:
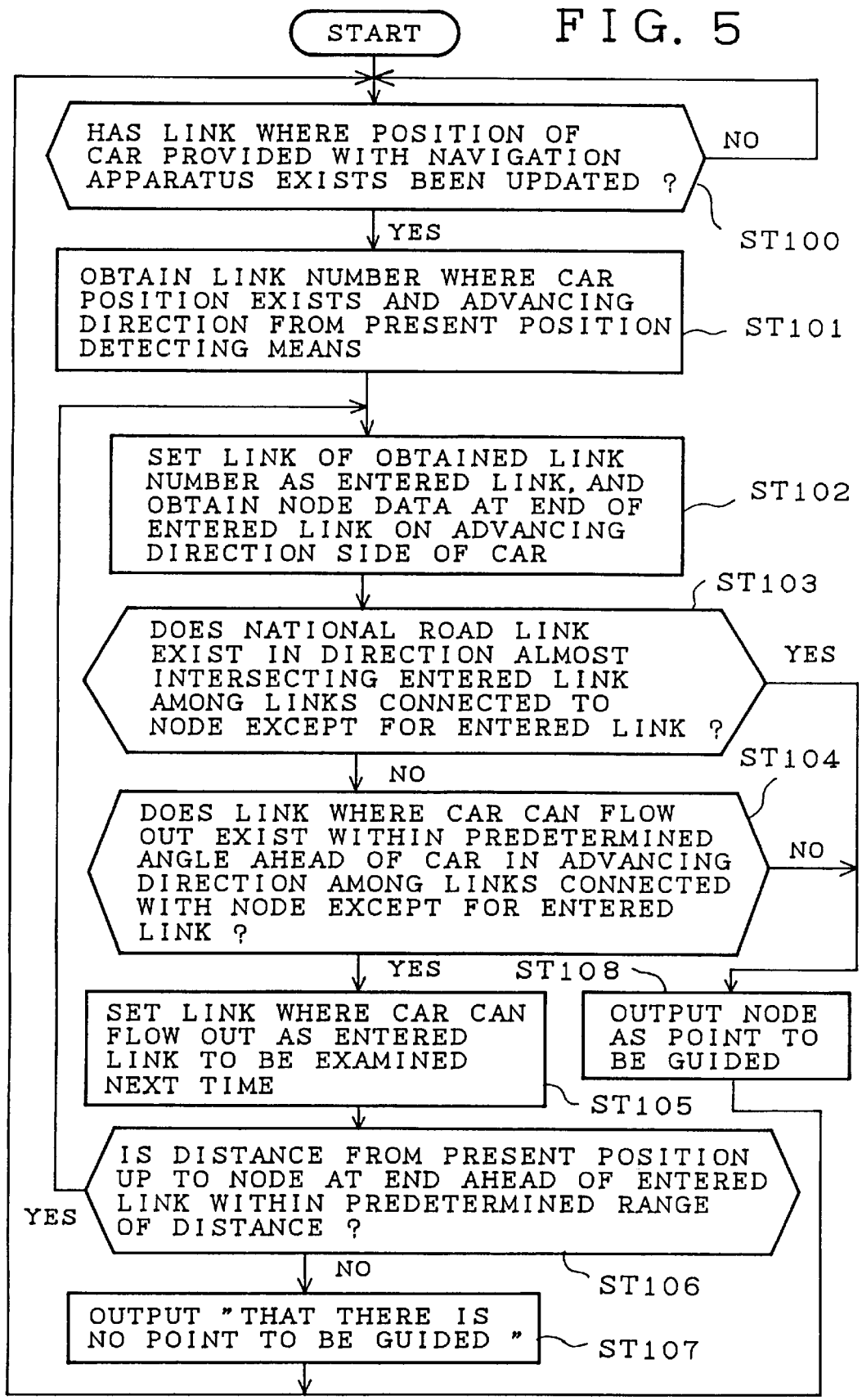
FIG. 5 is a flow chart showing the operation of the navigation apparatus of the embodiment 1.

The method to detect a road intersection to be guided is almost the same as the process shown in the flow chart of FIG. 5, except for the following points. That is to say, the step ST103 of the flow chart is omitted, and the content of processing at the step ST104 is changed into "Is there a route link where an automobile can flow out within a predetermined angle ahead of the entered direction among the links connected to the node except for the entered link ?". At the step ST104, a point where the route bends by the predetermined angle or more is output as a point to be guided. The following processes of the guide information processing means 4 after the step ST104 may be the same as those of the embodiment 1 shown in FIG. 9. Or the process corresponding to the step ST207 may be the process capable of highlighting the route which the automobile should select at an intersection by obtaining road center line data each corresponding to a route link entering into the intersection and a route link flowing out of the intersection similarly to the process for drawing the arrow 37 in the processes at the step ST207 to draw for example a heavy full line on the line indicated by the road center line data.

Embodiment 3

Figure 11:
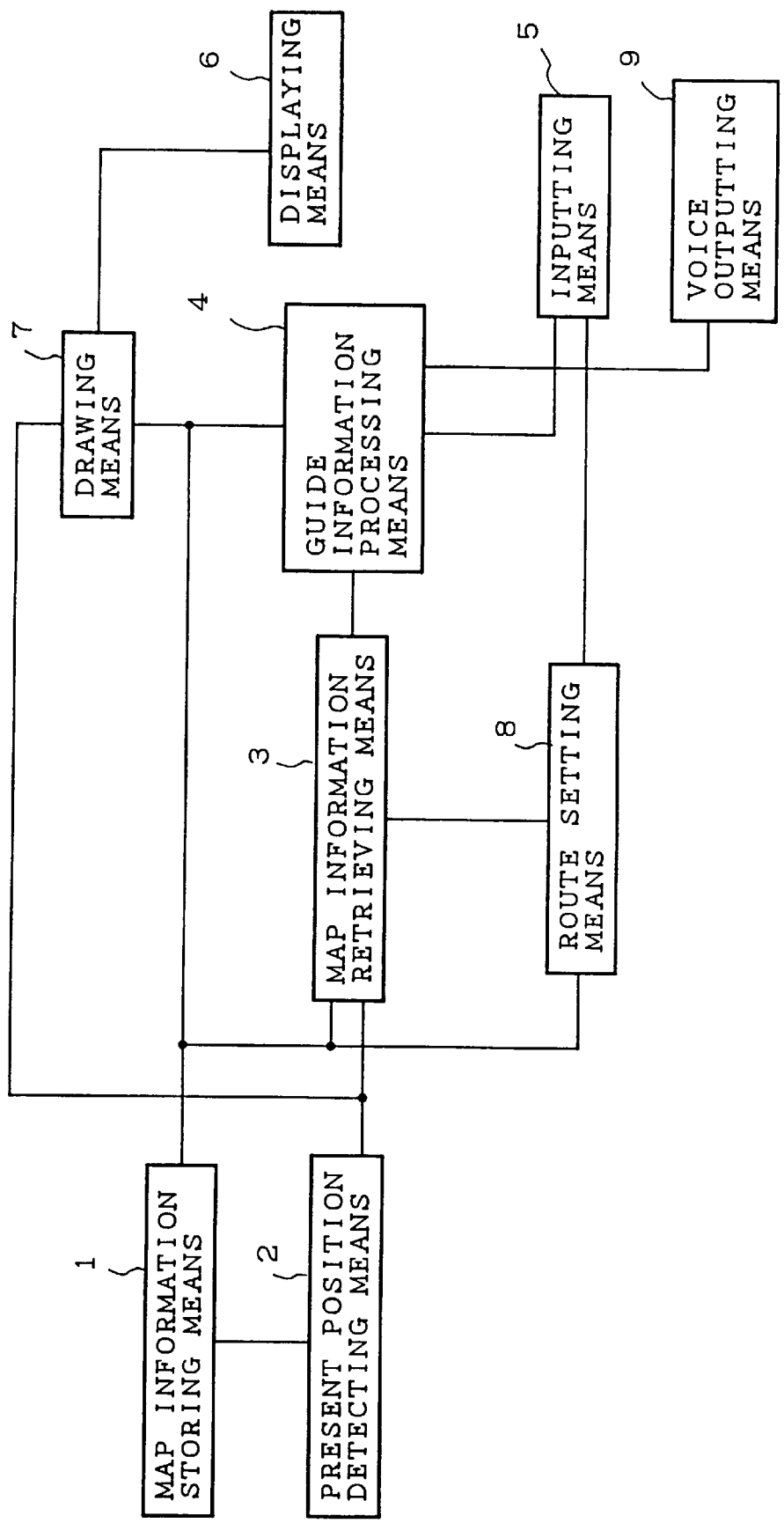
FIG. 11 is a block diagram showing the system construction of a navigation apparatus according to the embodiment 3.

The navigation apparatus according to the embodiment 3 of the present invention, as shown in the block diagram of FIG. 11 showing the construction of the system thereof, is one further adding the voice outputting means 9 to the construction of the embodiment 2. Various modes are conceivable as the voice outputting means 9: a mode to transform input phonemic code trains into voice signals by referring to the voice word dictionary provided therein like Systematic Voice Synthesizing Method; a mode which, after digitizing recorded voices into digital data by means of Pulse Code Modulation (PCM) Method or Adaptic Differential Pulse Code Modulation (ADPCM) Method, divides the digital data into clause units and stores them in a memory provided therein, and which obtains voice signals by reading out voice data in order in conformity with clause codes given from outside and executing the digital-to-analogue conversion of them; a mode which comprises a buffer RAM in the voice outputting means 9, and temporary reads PCM/ADPCM data stored in the map information storing means 1 together into the buffer RAM in conformity with clause codes given from the outside to send the read data into a digital to analogue (D/A) converter for transforming into voice signals; or the like. Provided that the system reproduces voice signals in conformity with clause codes given from the outside on the basis of the PCM/ADP voice data of clause units stored in the voice outputting means 9, the operation of the system will be described hereinafter.

FIG. 12 shows clause codes assigned to each clause in the voice outputting means 9 and the content of voice waveforms to be uttered when the clause codes are input into the voice outputting means 9. The content has been set on the supposition that the distance to a point to be guided ahead of an automobile provided with the navigation apparatus and the advancing direction which the automobile should be going guided.

Figure 13:
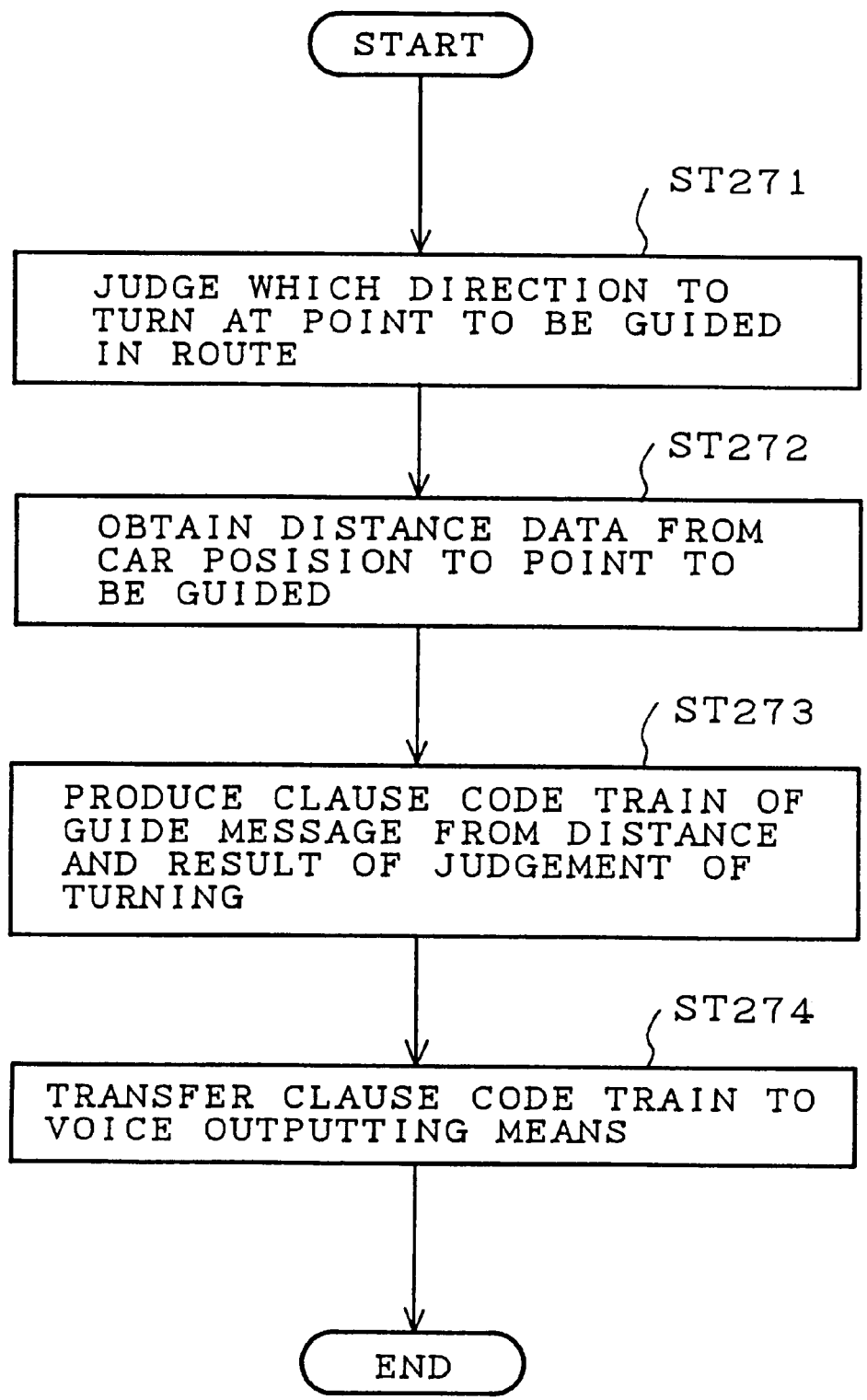
FIG. 13 is a flow chart showing the process in case of outputting a voice guide in the navigation apparatus of the embodiment 3.

The method to detect points to be guided in the operation of the system is the same as that described as to the embodiment 2. The processes in the guide information processing means 4 after that are the same as those of the embodiment 1 and the embodiment 2 until the step ST207 shown in FIG. 9. The processes shown in the flow chart of FIG. 13 are executed in the present embodiment after the process of the step ST207 has executed and before the process of the step ST208 is executed.

At first, which direction to turn at a point to be guided on a route is judged (step ST271). This judgement can be done by obtaining the entered route link and the flowing out route link both connected to the node to be guided from route data, and by computing the flowing out angle of the route to the entered direction to the node from the link connecting angle to the node recorded in the map information. That is to say, if the flowing out angle changed into a clockwise direction to the entered direction, the direction to turn is judged to be the right; if the angle changed into a counter-clockwise direction, the direction is judged to be the left. Since the nodes where routes are bending by a predetermined angle or more are originally selected as the intersections to be guided, results that almost agree with the sense of a driver can be obtained by means of the aforementioned judgement.

Next, the distance from the automobile position to the point to be guided is obtained (step ST272). If the map information retrieving means 3 obtained the distance also when the means 3 detected the point to be guided and transferred the distance to the guide information processing means 4, the transferred value may simply be used; if there is no distance information transferred from the map information retrieving means 3, the distance may be obtained by obtaining the number of a link where the automobile exists from the present position detecting means 2, and by obtaining the lengths of each link constituting the link train from the link where the automobile exists to the link to enter into the point to be guided from the map information, and then by integrating the lengths of each link.

After obtaining the distance to the point to be guided and the result of the judgement on the turning to right or left, a clause code train of a guide message is produced by means of the distance and the result of the judgement (step ST273). As shown in the explanatory diagram of FIG. 12 showing the relationships between the clause codes and the voices, the clause codes having "01" in the upper two digits among the four digits of the clause codes designate distance messages; the clause codes having "02" in the upper two digits designate the messages indicating advancing directions. Accordingly, the first clause codes are set as codes having "01" in the upper two digits and representing distances indicated by the unit of kilo-meter (Km). The second clause codes are set as "0201" or "0202" in accordance with the judgement results of turning directions. For example, if a voice message of "Turn to the left at about two kilo-meters off." is needed, a clause code train composed of two clause codes of "0102" and "0202" is generated.

The obtained clause code train is transferred to the voice outputting means 9 in the order. When the voice outputting means 9 receives the code train, it executes the D/A transformation of the voice wave-form data in conformity with the correspondence relationships shown in FIG. 12, and outputs them as voice signals. As a result, the navigation system displays a road intersection map like one shown in FIG. 6A in response to a request of a driver, and also a voice guidance of "Turn to the left at about two kilo-meters off." is informed to a driver.

Embodiment 4

In all of the embodiments described above, the road intersection map data for guidance are previously produced as a set of graphic information to be stored in the map information storing means 1. But such a system has a problem that it is obliged to suppose a case where the guide map at a point selected to be guided cannot be displayed as shown in the step ST203 as shown in FIG. 9, because it is difficult to have produced road intersection maps to all nodes owing to the amount of the operations for producing and the amount of the data. For resolving the problem, there is provided a navigation system for producing road intersection maps directly from road network data as the embodiment 4. The construction of the navigation system of the embodiment 4 is the same as that of the embodiment 2 shown in FIG. 10. It is of course that the construction of the navigation system may be one shown in FIG. 11 which has the voice outputting means 9.

The operation of the map information retrieving means 3 of the present embodiment will be described in conjunction with the flow chart of FIG. 14. At first, the map information retrieving means 3 receives route data which were set by means of the route setting means 8, and sets the first link in the link train constituting the route as the link to be examined (step ST300). Next, the map information retrieving means 3 obtains the node data of the end point on the target destination side of the link to be examined from the map information (step ST301). If the obtained node is the target destination node at the end of the route, the map information retrieving means 3 ends this processes (step ST302); if not, the map information retrieving means 3 goes to the step ST303.

At the step ST303 the map information retrieving means 3 obtains the next route link (flowing out route link) connected to the link to be examined through the obtained node from the route data. Next, referring to the connected link angle described in the obtained node data, the map information retrieving means 3 computes the relative angle formed by the link to be examined and the flowing out route link, and examines whether the computed angle is a predetermined angle or more (step ST304). If the angle is more than the predetermined angle, the map information retrieving means 3 judges the node to be a point to be guided, and reads out the node data and the data of all of the links connected to the node by referring to the map information stored in the map information storing means 1 to save them therein (step ST305). If the angle formed by the link to be examined and the flowing out route link is the predetermined angle or less at the step ST304, the map information retrieving means 3 skips the step ST305 to execute the process of the step ST306. At the step ST306, the means re-defines the flowing out route link as the link to be examined to return to the step ST301, and repeats the same processes as the aforementioned ones.

Figure 14:
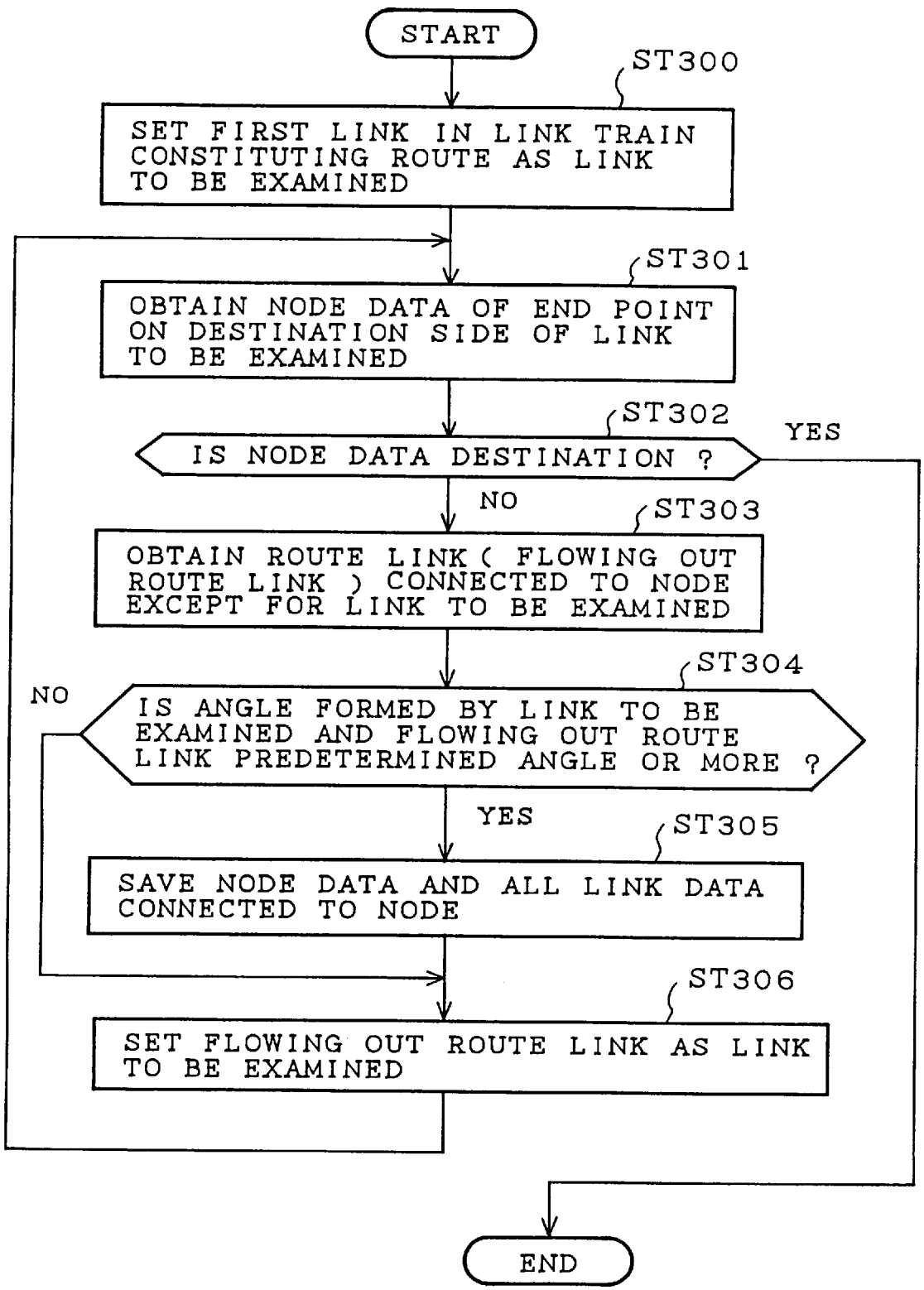
FIG. 14 is a flow chart showing a part of the operation of a navigation apparatus according to a fourth embodiment (embodiment 4) of the present invention.
Figure 15:
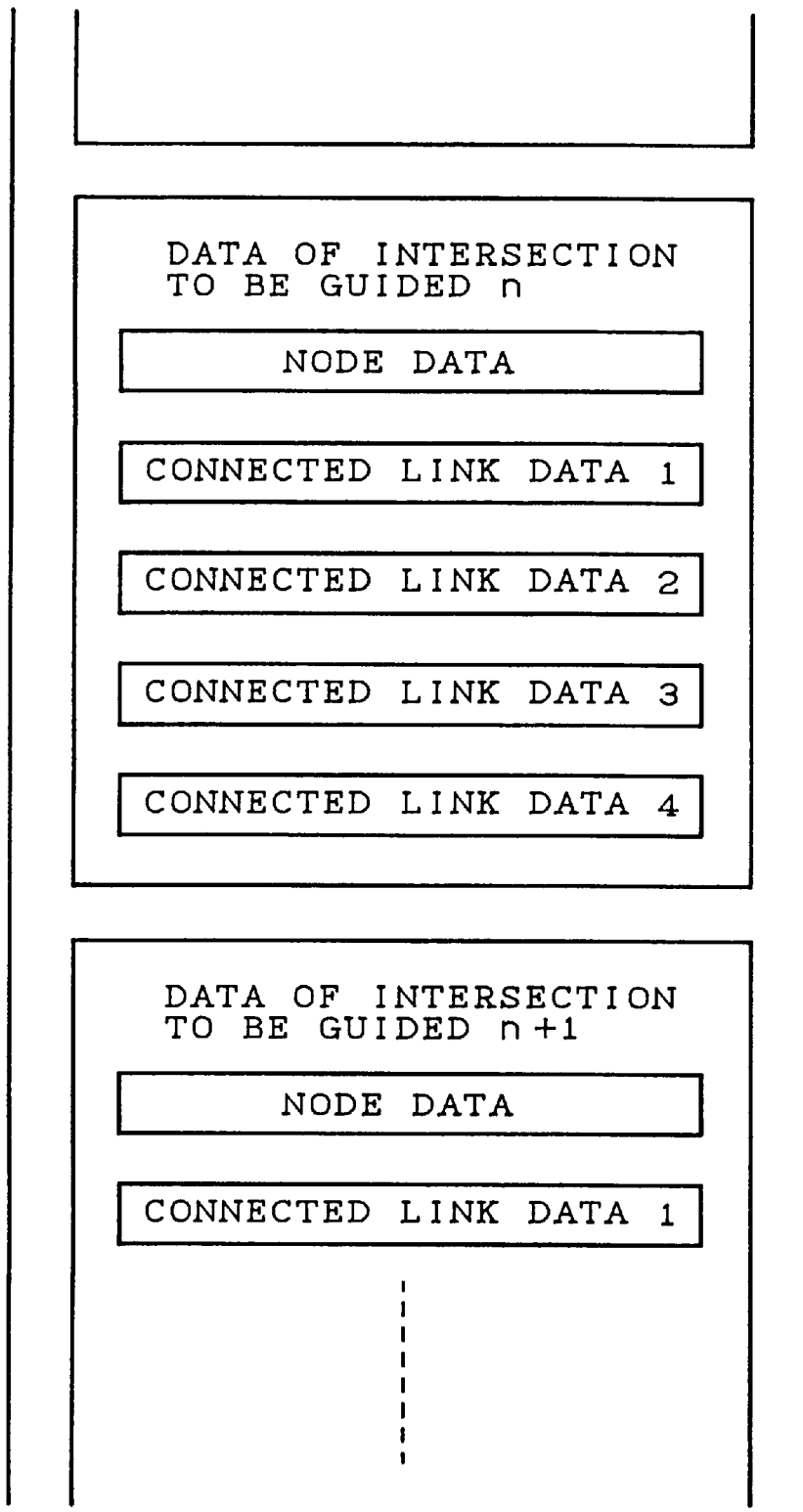
FIG. 15 is an explanatory diagram showing road intersection data to be saved intermediately in the navigation apparatus of the embodiment 4.

FIG. 15 shows an example of a data group of intersections to be guided produced by means of the aforementioned method. Since the map information retrieving means 3 executes the retrieval up to the target destination at a stretch when the means 3 receives route link data from the route setting means 8, at a stage where the processes shown in FIG. 14 have finished, the node data and connected link data concerning all intersections to be guided from the starting point to the target destination have been obtained in the form of FIG. 15 as the data of intersections to be guided.

When an automobile position is described on a route after the processes of FIG. 14 have completed, the display mark 38 indicating the existence of the guide information generated in the navigation apparatus which is capable of providing it to the driver by displaying it on an ordinary map displaying screen as shown in FIG. 3 and the navigation apparatus informs to the driver that the guide information can be informed to the driver. When a request from the driver is input into the navigation system by means of the inputting means 5 in the state of being capable of guidance, the guide information processing means 4 executes the processes as shown in the flow chart of FIG. 16.

Figure 16:
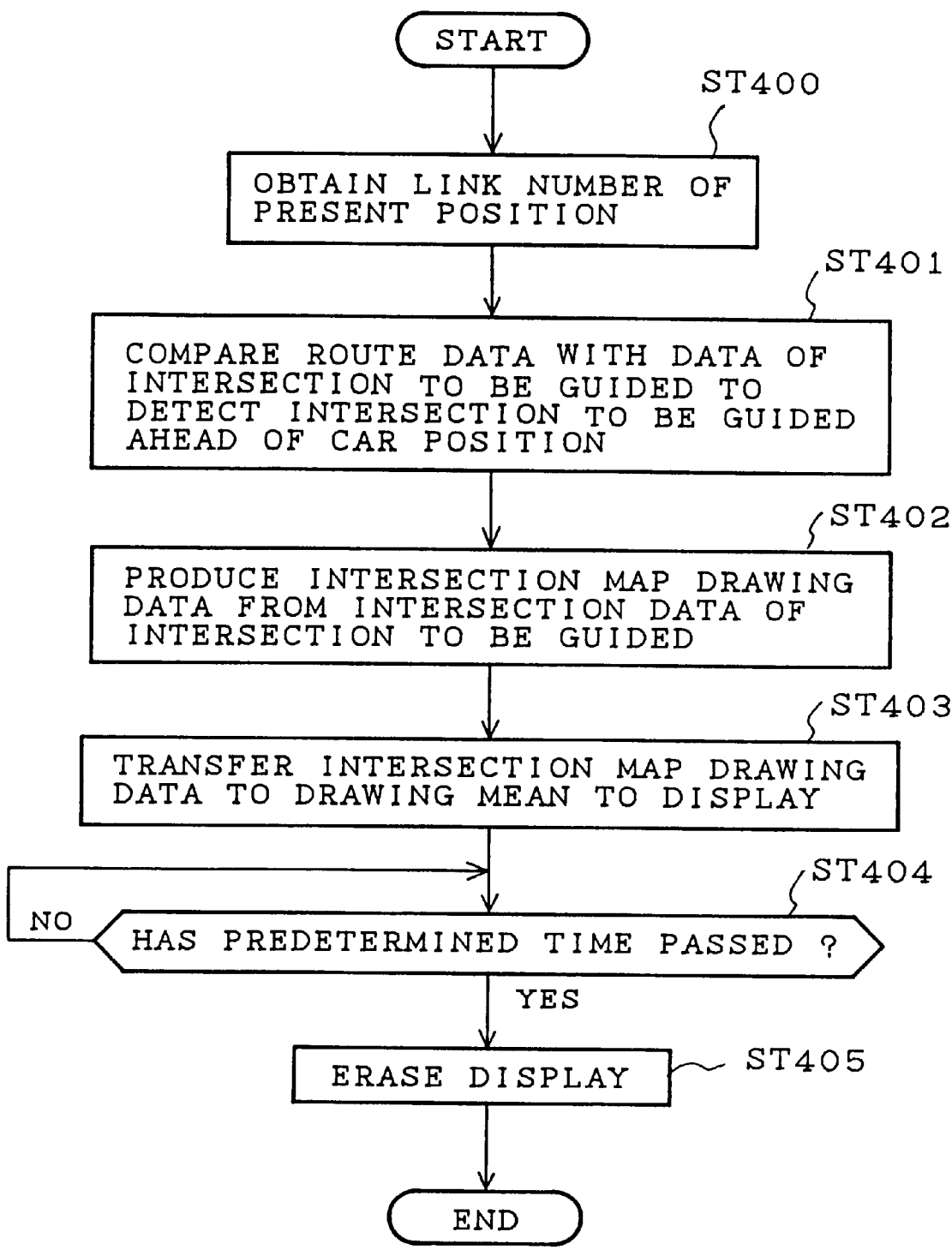
FIG. 16 is a flow chart showing a part of the operation of the navigation apparatus of the embodiment 4.

According to the flow chart of FIG. 16, at first, the guide information processing means 4 obtains the link number of the present position where the automobile position exists from the present position detecting means 2 (step ST400). Next, the guide information processing means 4 retrieves nodes on route links from route link data saved in the map information retrieving means 3 from the present position link to the target destination side in order to compare the obtained nodes on the route links with the data of the intersection to be guided for detecting the next intersection to be guided ahead of the automobile position (step ST401).

Figure 17:
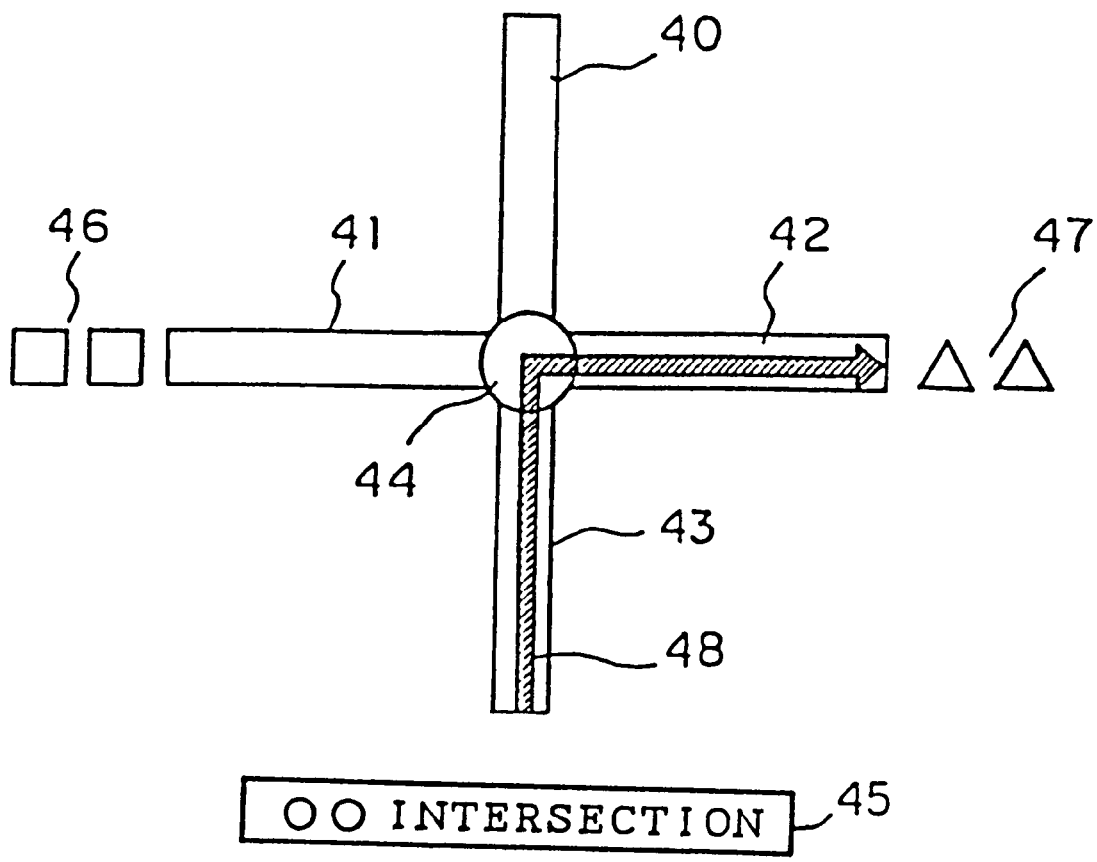
FIG. 17 is an explanatory diagram of a road intersection map to be displayed by the navigation apparatus of the embodiment 4.

The guide information processing means 4 obtains the detected intersection data of the road intersection to be guided from the map information retrieving means 3 to produce road intersection map drawing data of the intersection to be guided by means of the road intersection data (step ST402). Various road intersection maps can be generated, but the road intersection map as shown in FIG. 17 will be described here as an example. In the figure, reference numerals 40–43 denote full lines of rectangles or having widths representing road links connected to an intersection. A reference numeral 44 denotes a circle representing the intersection. A reference numeral 45 denotes a letter train representing the name of the intersection. Reference numerals 46 and 47 are letter trains representing the target destination names being point names where an automobile reaches if the automobile goes to the directions. A reference numeral 48 denotes a route mark indicating the advancing direction at the intersection.

At first, the guide information processing means 4 obtains link connection angles of the connected links from the node data among the road intersection data to draw straight lines having widths 40–43 to the connection angle directions by taking the center point of the display surface as the original point. As for the connection angles of each road, the direction of the route link through which the automobile enters the road intersection is set in the perpendicular direction; the other links are drawn in accordance with relative angles to the entered link direction. Of course, they may be drawn in accordance with the absolute angles, for example the north is set in the upper direction, in some uses. The link connection angles in the node data may be used as the drawn angles of the straight lines as they are, or the link connection angles quantized into eight azimuths, sixteen azimuths or the like may be used for shaping. Next, a painted out circle representing the road intersection is drawn in the center of the screen where each road meets. The intersection name 45 is drawn at the lower part of the display screen by means of the node name described in the node data. If there is the statement of the data of a target destination name (or a destination name) in the link data, the guide information processing means 4 obtains the data to draw the target destination name letter train 46 and 47 at the end of the straight line having a width representing a corresponding link. At last, the means 4 draws a straight line having a slightly slender width over the drawn wide line from the center of the screen to the connection angle direction by using the link connection angles of the entered link into the intersection and the flowing out link again. A triangle is also drawn at the end of the flowing out link. They constitute the route mark 48 at the intersection.

Returning to the flow chart of FIG. 16, the guide information processing means 4 transfers the drawing data generated by means of the method described above to the drawing means 7 to display them on the displaying means 6 (step ST403). After a predetermined time has past since the drawing data were displayed (step ST404), the guide information processing means 4 sends an instruction to the drawing means 7 to erase the intersection map (step ST405).

Since the navigation apparatus of the embodiment 4 operates as described above, after the map information retrieving means 3 has processed the map information at first, the operation of reading map information out of the map information storing means 1 is not generated at the timing of the movement of the automobile from the present position or a request from the inputting means 5, and consequently, there is no generation of waiting time for reading out from the CD-ROM. Therefore, rapid response to a request from the inputting means 5 can be realized. Only the guidance to the intersection to be guided at the nearest point ahead of the automobile position was described in the present embodiment, but it is of course to be able to perform the display of intersections to be guided farther than the intersection in response to continuing requests by means of the inputting means 5.

Embodiment 5

Figure 18:
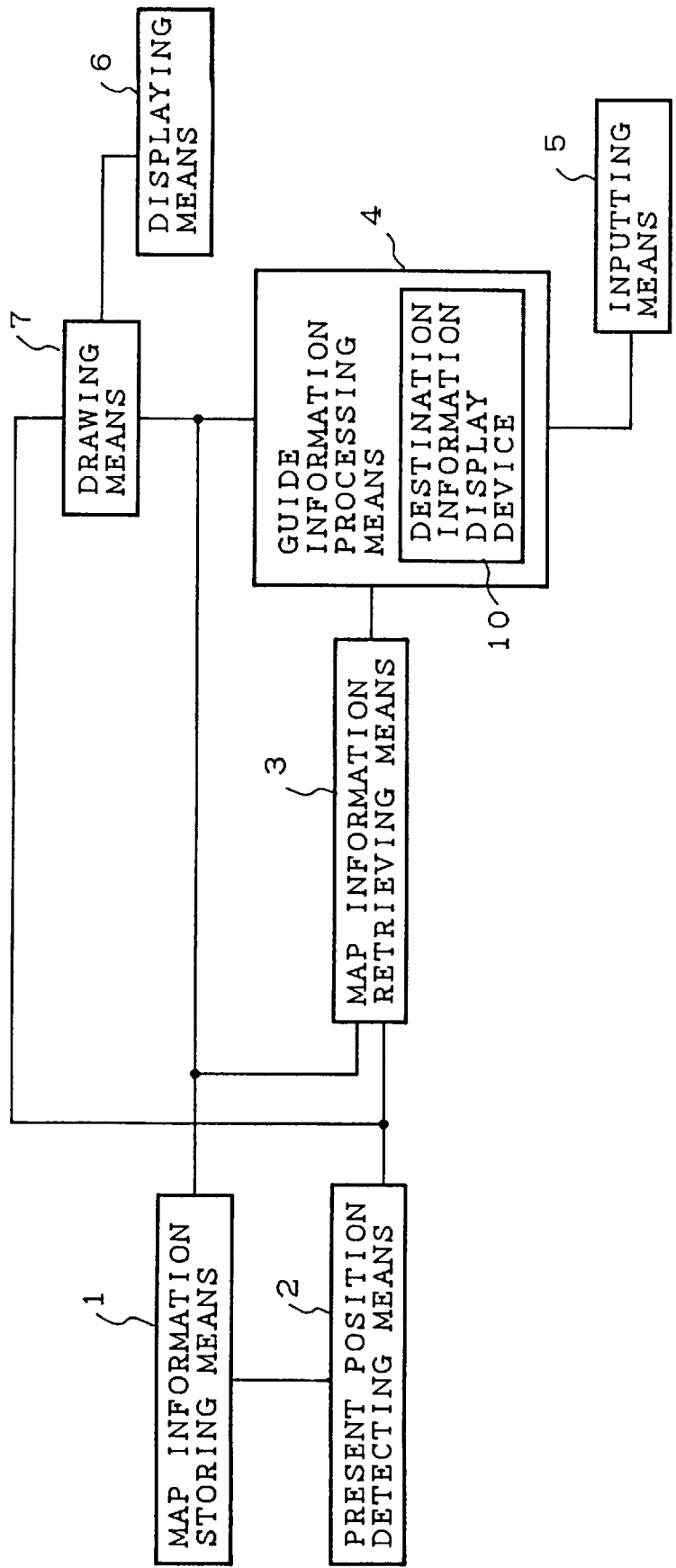
FIG. 18 is a block diagram showing a system configuration of a navigation apparatus according to a fifth embodiment (embodiment 5) of the present invention.

FIG. 18 is a block diagram showing a system configuration of a navigation apparatus according to a fifth embodiment (embodiment 5) of the present invention. In FIG. 18, a reference numeral 10 designates a target destination guide information displaying device (hereinafter referred as "destination information display device" in the following description and also referred as "target destination guide information displaying means" in claims) for generating guide information from the present place of an automobile to the target destination to which the automobile or the automobile is moving based on the guide information generated by the guide information processing device 4 in the navigation apparatus of the embodiment 1 as shown in FIG.1, and for transmits the generated guide information to the displaying means 6 through the drawing means 7, then the displaying means 6 displays the guide information on a map. This destination information display device 10 is incorporated in the guide information processing device 4. Because other configuration elements such as the map information storing means 1, the present position detecting means 2, the map information retrieving means 3, the guide information processing means 4 and the inputting means 5 and the displaying means 6 have the same configuration elements designated by the same reference numbers used in the navigation apparatus of the embodiment 1 as shown in FIG. 1, the explanations for them are omitted here.

Figure 19:
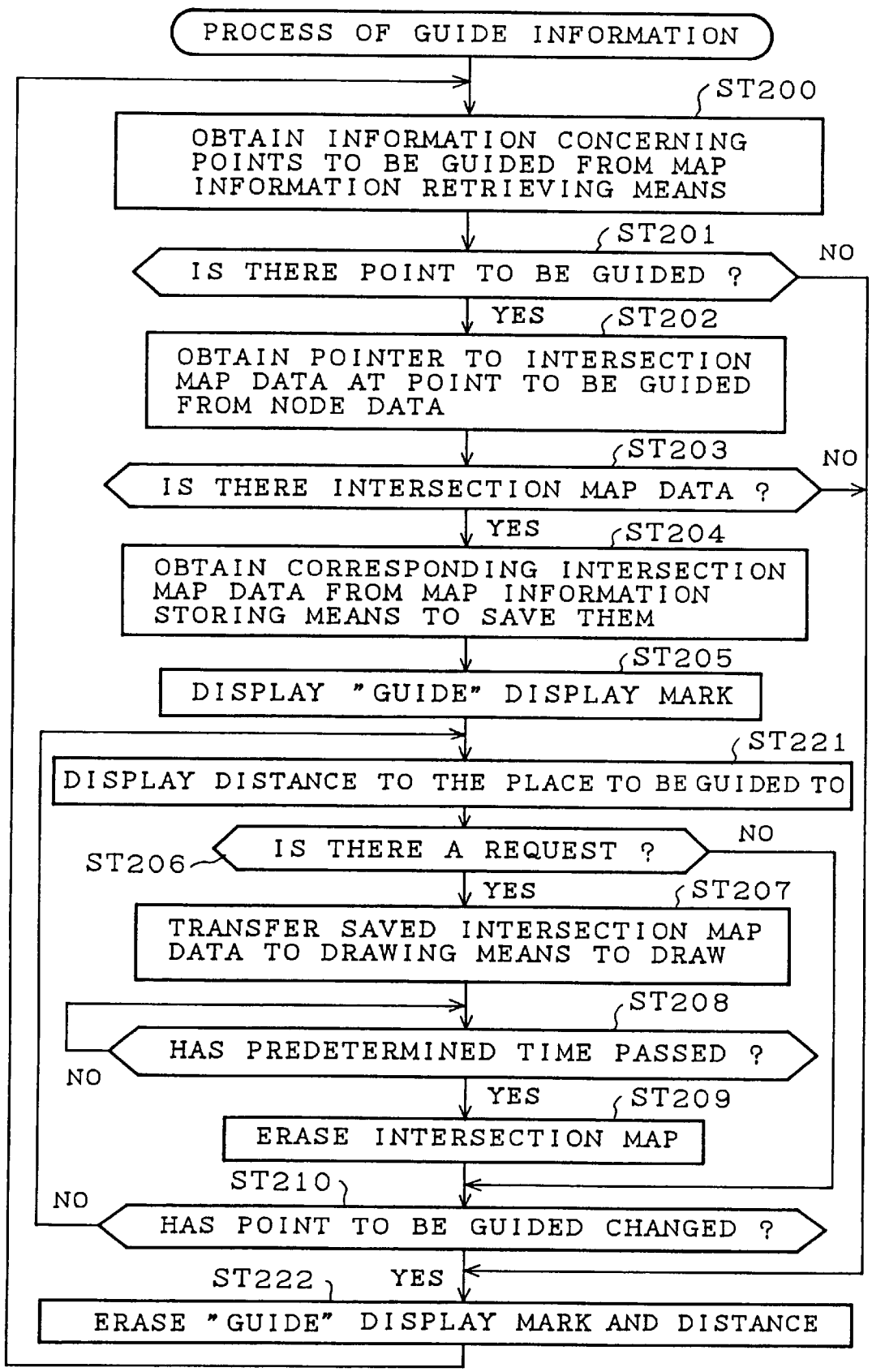
FIG. 19 is a flow chart showing a part of the operation of the navigation apparatus according to the embodiment 5 of the present invention shown in FIG. 18.

Next, the operation of the navigation apparatus of the embodiment 5 will be explained. FIG. 19 is a flow chart showing a part of the operation of the navigation apparatus shown in FIG. 18 according to the embodiment 5 of the present invention.

Figure 20:
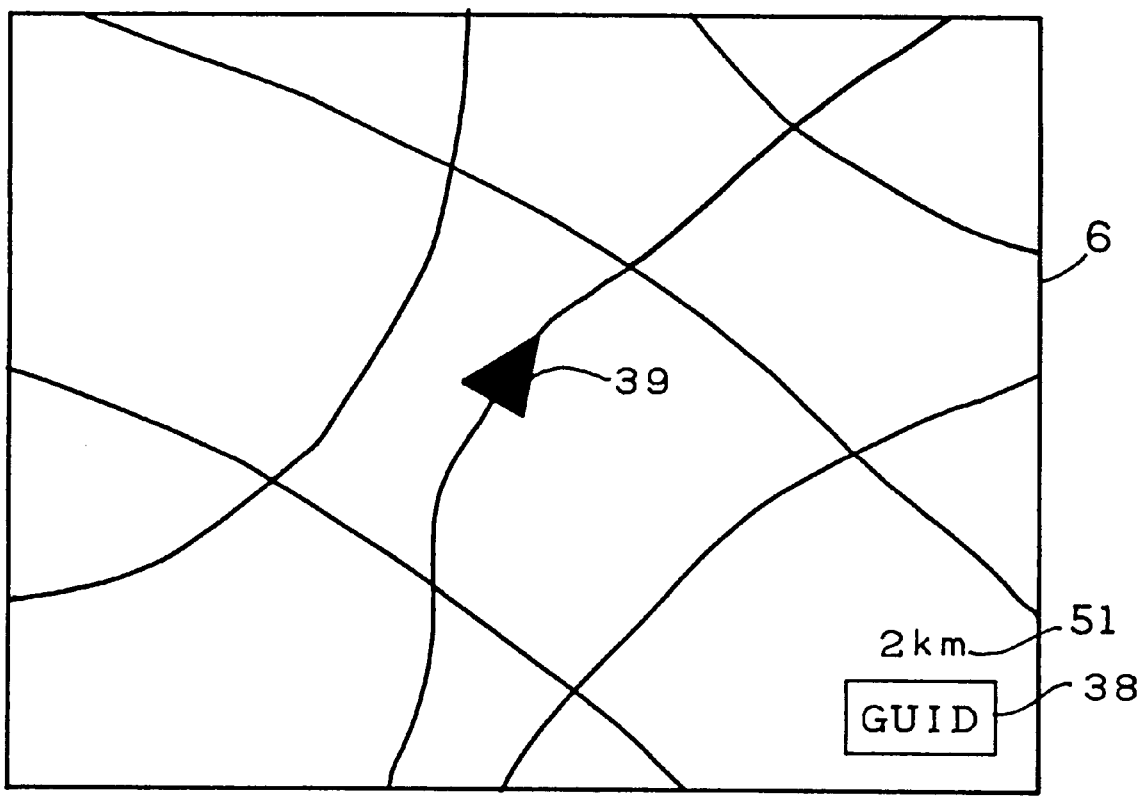
FIG. 20 is a display example on a screen in the navigation apparatus according to the embodiment 5 of the present invention shown in FIG. 18.

The method to display guide information for a target destination point is equal to the method of the embodiment 1 as shown in FIG. 9 basically excepting the following points. Namely, in the flow chart shown in FIG. 19 according to the embodiment 5, a step ST221 (for the process "DISPLAY DISTANCE TO THE PLACE TO BE GUIDED TO") is inserted between the step ST205 and the step ST206. The step ST222 (for the process "ERASE "GUIDE" DISPLAY MARK AND DISTANCE") performs the process for displaying a distance between the present point of an automobile or a car and the target destination on the displaying means 6. In addition, the step ST222 is also inserted instead of the step ST211 shown in FIG. 9. The step ST222 performs the process for erasing the display mark "GUIDE" and the displayed distance from the displaying means 6. The operations of the steps ST221 and ST222 are executed by the destination information display device 10 incorporated in the guide information displaying means 4, the operation result is transmitted to the displaying means 6 through the drawing means 7. As a result, in the operation of the step ST221, the process for displaying the distance to the target destination to be guided is executed, for example as shown in FIG. 20, the "2 Km" as the distance (guide information) designated by the reference numeral 51 between the present point 39 of the automobile and the target destination is displayed on the displaying means 6 as the distance to the target destination. This guide information is changed according to the movement of the automobile by the destination information display device 10. In the step ST222, the display mark "GUIDE" and the distance "2 Km" (guide information) designated by the reference numeral 51 displayed in the steps ST205 and ST221 on the displaying means 6 are erased.

As described above in detail, in the navigation system of the embodiment 5, because the distance between the present point 39 of the automobile and the target destination is displayed on the displaying means 6, there is the effect that a driver gets a rough guide information relating to the target destination without pushing or touching the touch panel switch or key of the distance "GUIDE" designated by the reference numeral 38 displayed on the displaying means 6 when the driver requires no detailed guide information.

Embodiment 6

Figure 21:
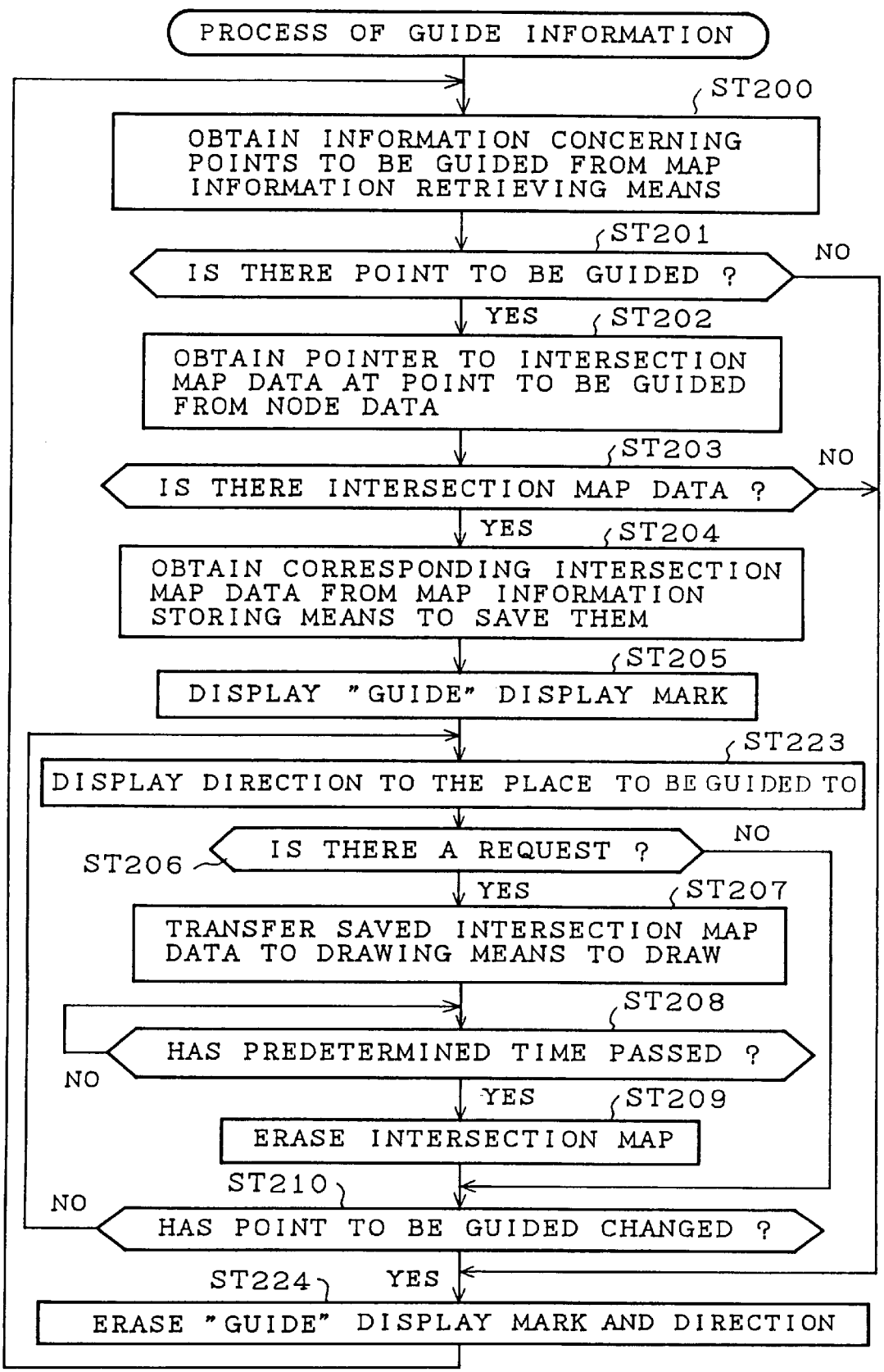
FIG. 21 is a flow chart showing a part of the operation of a navigation apparatus according to a sixth embodiment (embodiment 6) of the present invention.
Figure 22:
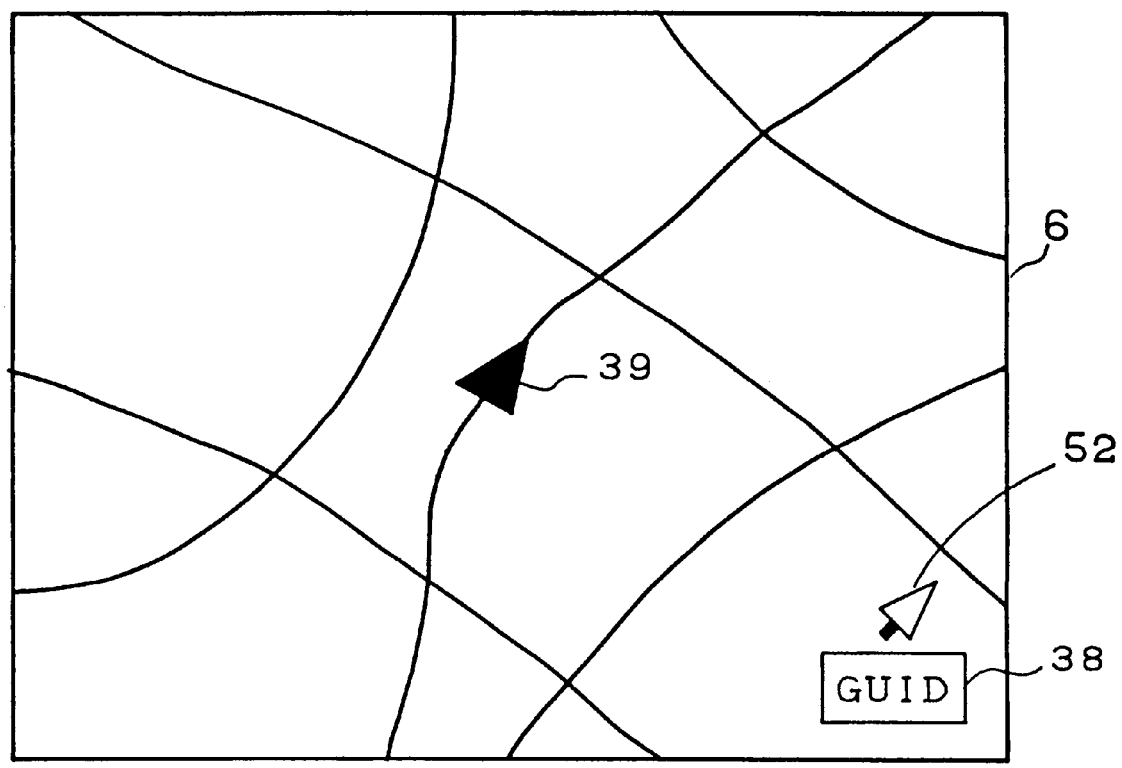
FIG. 22 is a display example on a screen in the navigation apparatus according to the embodiment 6 of the present invention shown in FIG. 21.

FIG. 21 is a flow chart showing a part of the operation of a navigation apparatus according to a sixth embodiment (embodiment 6) of the present invention. FIG. 22 is a display example on a screen in the navigation apparatus according to the embodiment 6 of the present invention shown in FIG. 21. In the step ST223 (for the process of "DISPLAY DIRECTION TO THE PLACE TO BE GUIDED TO) as shown in FIG. 21, an azimuth (or bearing designated by the reference symbol "arrow" 52 shown in FIG. 22) to the target destination point to be guided is displayed on the displaying means 6. In the step ST224 (for the step of "ERASE "GUIDE" DISPLAY MARK AND DIRECTION) as shown in FIG. 21, an erasing process for erasing the display mark "GUIDE" and the azimuth ("arrow" 52) displayed on the displaying means 6 is performed. The other operations of the navigation apparatus of the embodiment 6 are equal to that of the embodiment 5 as shown in FIG. 19, Therefore the explanations for other steps are omitted here. The guide information used in the step ST223 is generated by the destination information display device 10 and displayed on the displaying means 6. In addition, because the system configuration of the navigation apparatus of the embodiment 6 is equal to that of the navigation apparatus of the embodiment 5, the explanations of them are omitted here.

Next the operation of the navigation apparatus of the embodiment 6 will be explained.

Guide information used in the step ST223 is generated by the destination information display device 10 incorporated in the guide information processing means 4. The generated guide information is transmitted to the displaying means 6 through the drawing means 7. As a result, in the operation in the step ST223, the arrow 52 (guide information) indicating the azimuth (or bearing) from the present position of the automobile designated by the reference numeral 39 to the target destination point is displayed above the display mark "GUIDE" 38 on the displaying means 6 as shown in FIG. 22. The driver of the automobile can recognize the azimuth to the target destination point by watching the arrow 52 displayed on the displaying means 6. In the step ST224, the display mark "GUIDE" and the displayed symbol "arrow" designated by the reference numerals 38 and 52 respectively are erased from the displaying means 6. Because the operations of other steps in the flow chart of the embodiment 6 shown in FIG. 21 are same as those of the steps designated by the same reference characters in the flow chart of the embodiment 5 shown in FIG. 19, the explanations for them are omitted here.

As described above in detail, in the navigation system of the embodiment 6, because the azimuth from the present point 39 of the automobile to the target destination is provided to the driver as a rough and effective guide information to the target destination by the displaying means 6 in easy or simple form (arrow form) for recognition, there is an effect that the driver can know the rough and effective guide information to the target destination point without any pushing or touching of the display mark "GUIDE" designated by the reference numeral 38 displayed on the displaying means 6 when the driver requires no detailed guide information.

Embodiment 7

Figure 23:
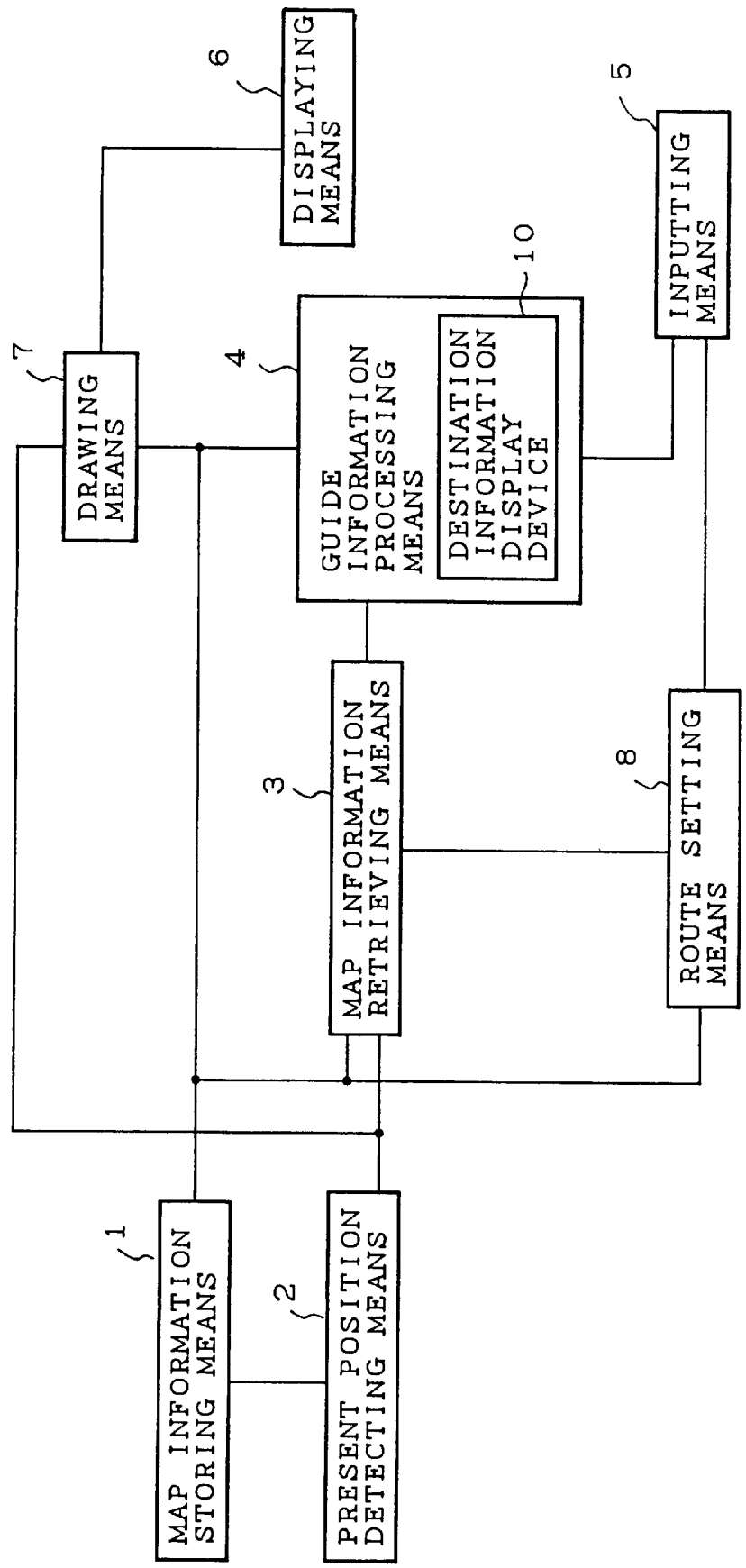
FIG. 23 is a block diagram showing a system configuration of a navigation apparatus according to a seventh embodiment (embodiment 7) of the present invention.
Figure 24:
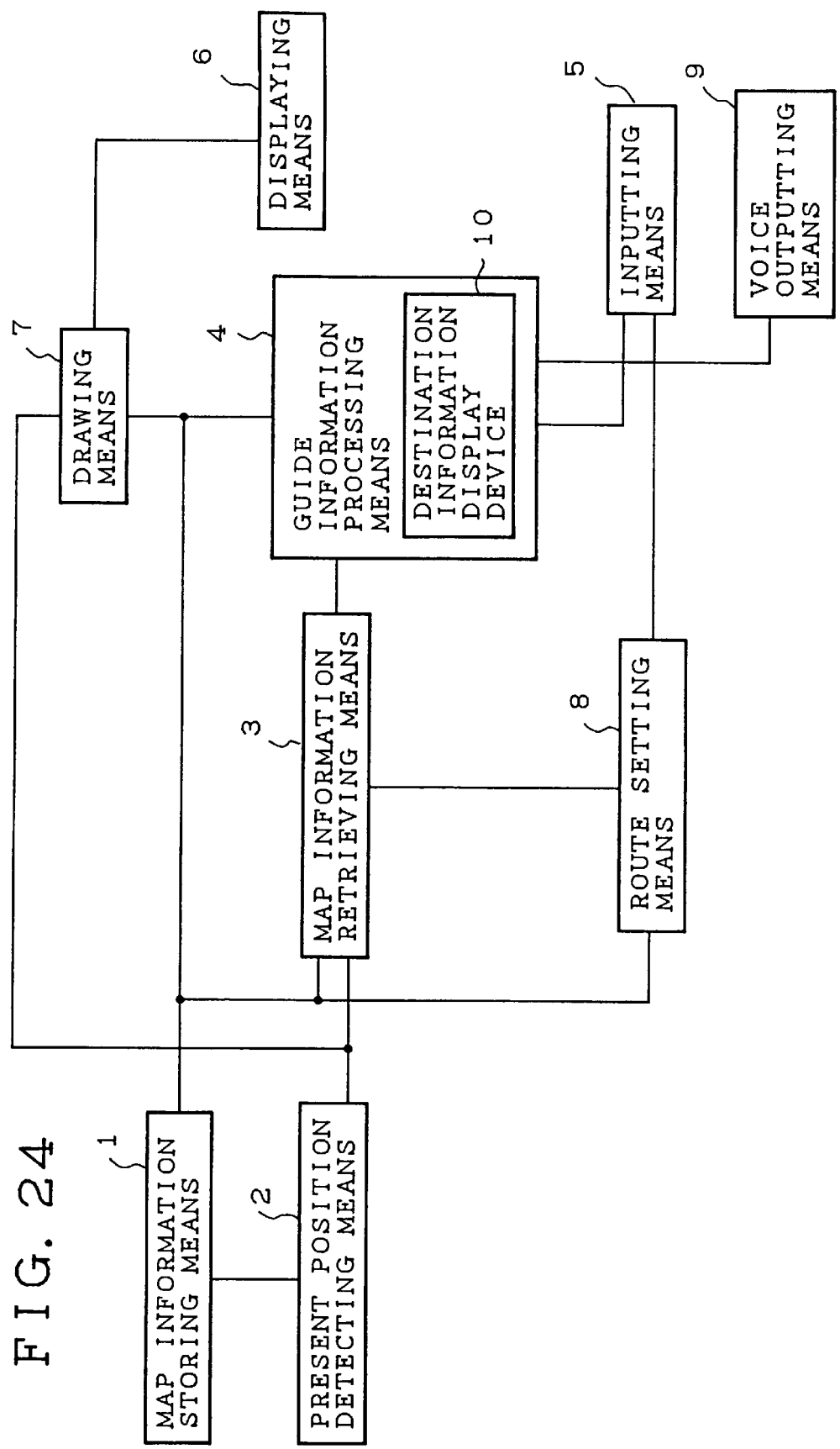
FIG. 24 is a block diagram showing another system configuration of a navigation apparatus according to the embodiment 7 of the present invention.

FIG. 23 is a block diagram showing a system configuration of a navigation apparatus according to a embodiment 7 of the present invention. FIG. 24 is a block diagram showing another system configuration of a navigation apparatus according to the embodiment 7 of the present invention. The configurations of the navigation apparatus of the embodiment 7 shown FIGS. 23 and 24 have the combinations of the system configurations between the navigation apparatus of the embodiments 5 shown in FIG. 18 and the embodiments 2 and 3 shown in FIGS. 10 and 11, respectively. The configuration of the navigation apparatus of the embodiment 7 shown in FIGS. 23 and 24 are equal to that of the navigation apparatus shown in FIGS. 10, 11 and 19 other than the destination information display device 10 which is incorporated in the guide information processing device 4. Therefore the explanations for them are omitted here.

Figure 25:
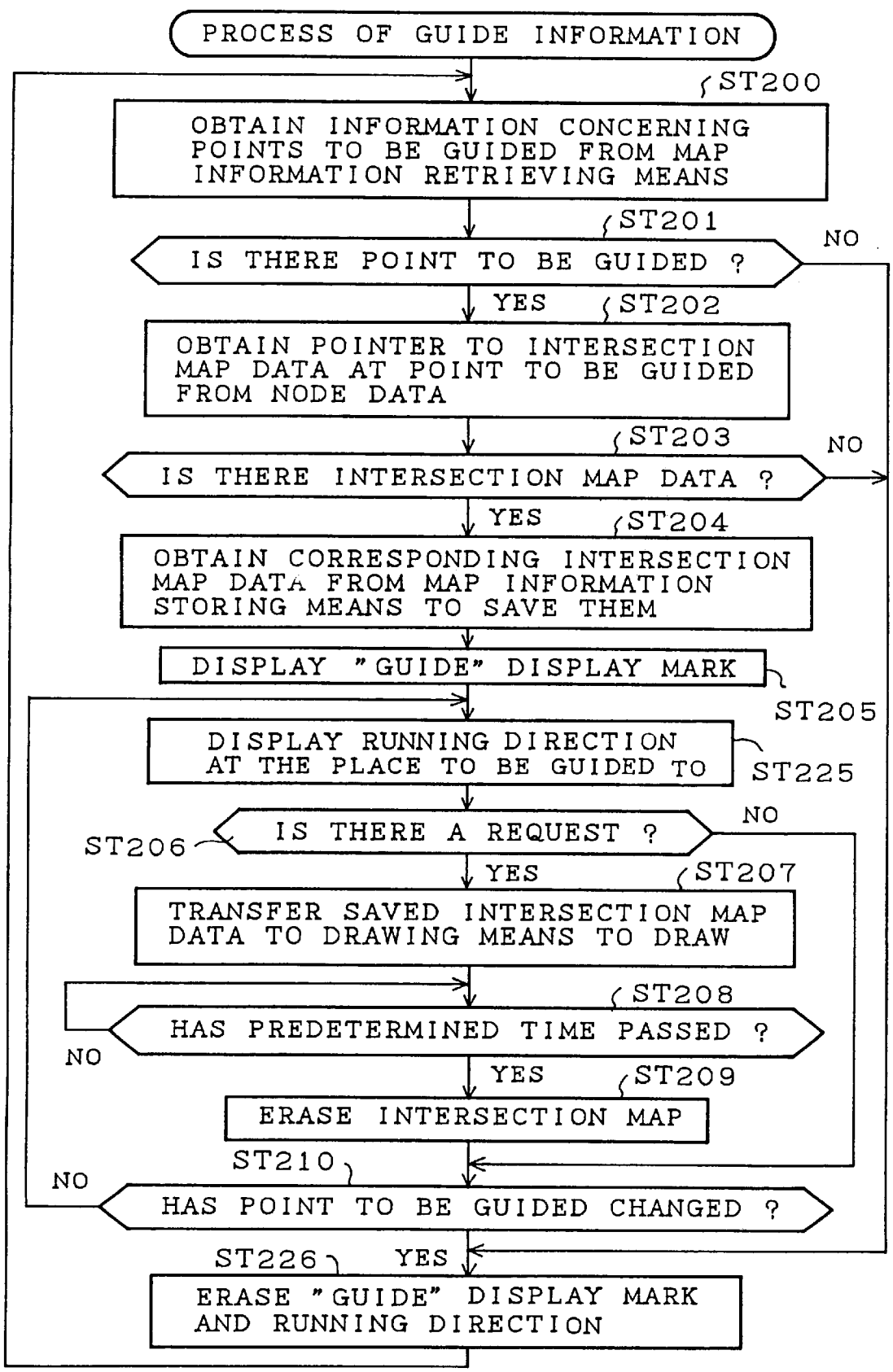
FIG. 25 is a flow chart showing a part of the operation of the navigation apparatus according to the embodiment 7 of the present invention shown in FIGS. 23 and 24.
Figure 26:
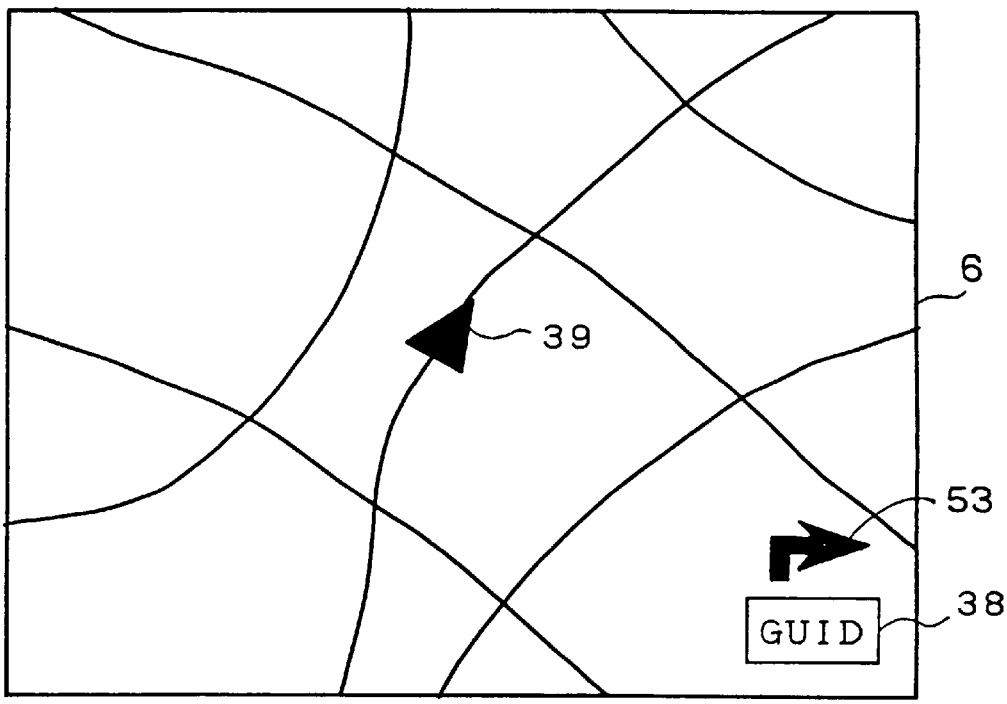
FIG. 26 is a display example on a screen in the navigation apparatus according to the embodiment 7 of the present invention shown in FIGS. 23 and 24.

FIG. 25 is a flow chart showing a part of the operation of the navigation apparatus according to the embodiment 7 of the present invention shown in FIG. 23 and FIG. 24. FIG. 26 is a display example on the displaying means 6 in the navigation apparatus according to the embodiment 7 of the present invention shown in FIGS. 23 and 24. In the step ST225 (for the step of "DISPLAY RUNNING DIRECTION AT THE PLACE TO BE GUIDED TO") in the flow chart shown in FIG. 25, a running direction mark (guide information) for indicating the running direction for the automobile to be moved at or near the target destination point is displayed on the displaying means 6 for the driver. In the step ST226 (for the step of "ERASE "GUIDE" DISPLAY MARK AND RUNNING DIRECTION") as shown in FIG. 25, the display mark "GUIDE" displayed at the step ST205 and the running direction mark displayed at the step ST225 are erased from the displaying means 6. The operations of other steps are same in operation as that of the flow chart of the embodiment 5 as shown in FIG. 19. The running direction mark 53 as the guide information used in the step ST225 is generated by the destination information display device 10 in the guide information processing device 4 and displayed by the displaying means 6.

Next, the operation of the navigation apparatus of the embodiment 7 will be explained.

The guide information used in the step ST225 is generated by the destination information display device 10 incorporated in the guide information processing device 4 and the generated guide information is transmitted to the displaying means 6 through the drawing means 7. As a result, in the step ST225, the running direction mark (arrow) 53 as the guide information is displayed above the display mark "GUIDE" on the displaying means 6. The driver can get the guide information in easy or simple form (arrow) by watching the running direction mark (arrow) 53 and recognizes the running direction to go near the target destination point. In the step ST226, the display mark "GUIDE" 38 and the displayed running direction mark "arrow" 53 (guide information) are erased from the displaying means 6. Because the operations of other steps in the flow chart of the embodiment 7 shown in FIG. 25 are same as those of the steps designated by the same reference characters in the flow chart of the embodiment 5 shown in FIG. 19, the explanations for them are omitted here.

As described above in detail, in the navigation system of the embodiment 7, because the running direction mark 53 (guide information) to go at or near the target destination point is provided to the driver as a rough and effective guide information by the displaying means 6 in easy or simple form (arrow form) for recognition, there is an effect that the driver can know the rough and effective guide information for the target destination point without any pushing or touching of the display mark "GUIDE" designated by the reference numeral 38 displayed on the displaying means 6 when the driver requires no detailed guide information.

Embodiment 8

Figure 27:
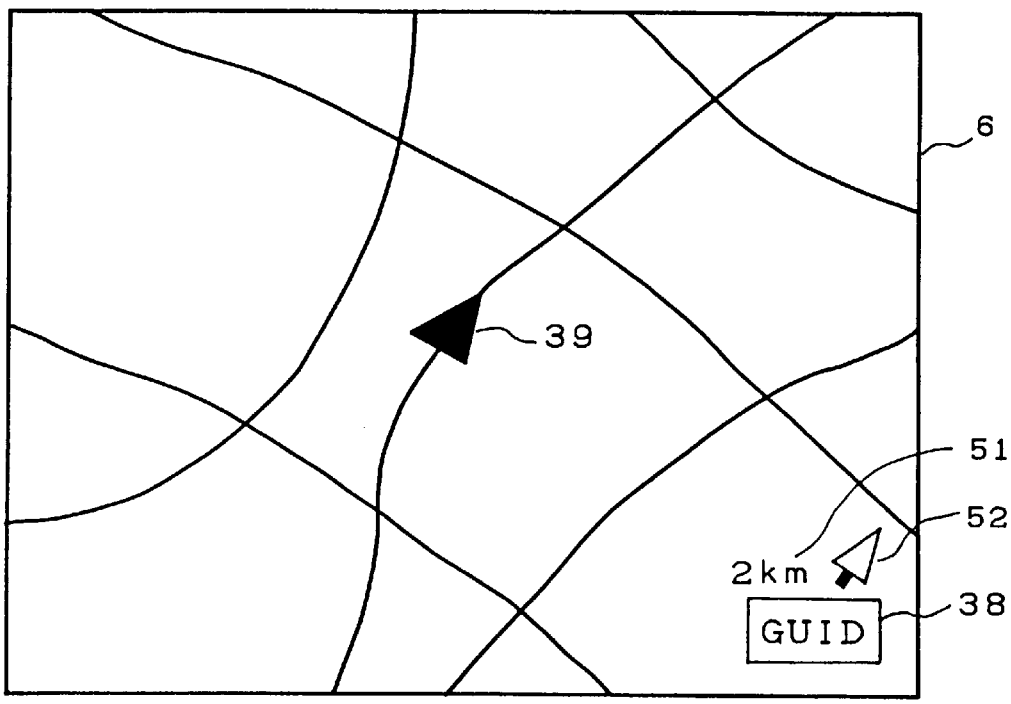
FIG. 27 is a display example on a screen in a navigation apparatus according to a eighth embodiment (embodiment 8) of the present invention.
Figure 28:
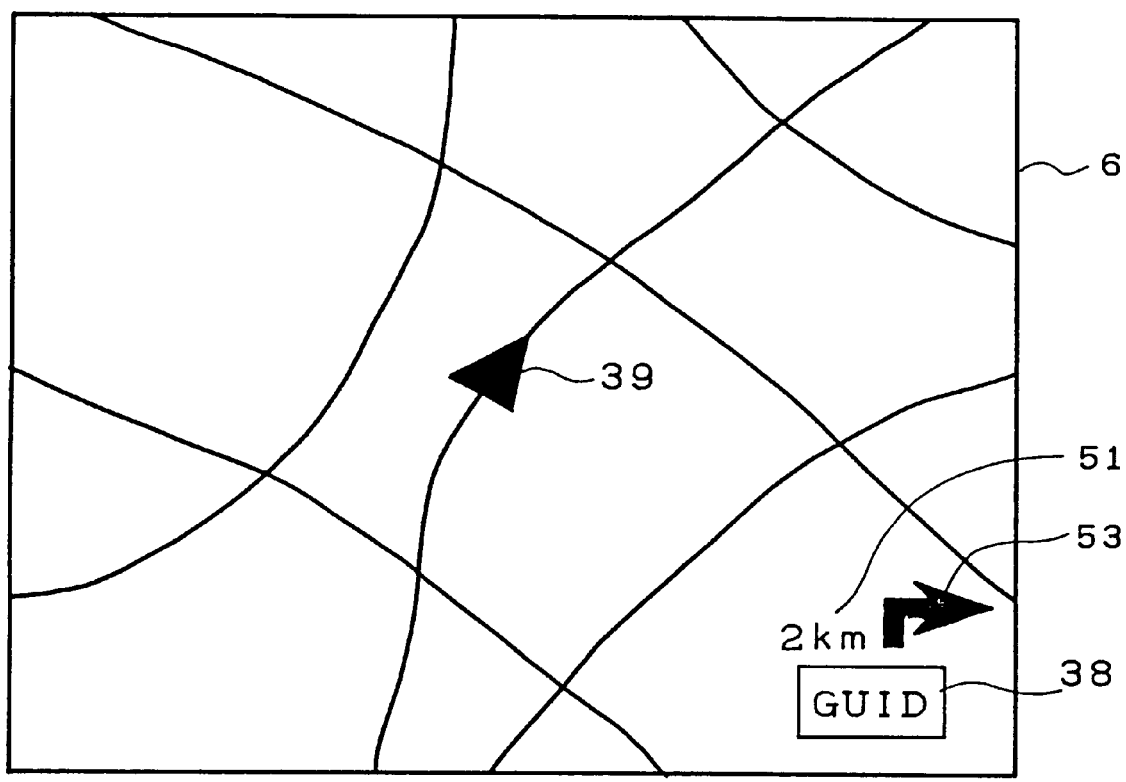
FIG. 28 is another display example on a screen in the navigation apparatus according to the embodiment 8 of the present invention.

FIG. 27 is a display example on a screen in a navigation apparatus according to the embodiment 8 of the present invention. FIG. 28 is another display example on a screen in the navigation apparatus according to the embodiment 8 of the present invention. Because the display mark 38 as the guide switch, the arrow 52 showing the azimuth from the present position of the automobile to the target destination point and the arrow 53 as the running direction mark to go at or near the target destination point in the embodiment 8 shown in FIGS. 27 and 28 are same as those used in the navigation apparatus according to the embodiments 5, 6 and 7, the explanations for them are therefore omitted here. In addition, because the system configuration of the navigation apparatus of the embodiment 8 is equal to that of the navigation apparatus of the embodiments 5 and 7, the explanations for them are omitted here.

Next the operation of the navigation apparatus of the embodiment 8 will be explained.

In the navigation apparatus of the embodiment 8, all of or a part of the guide information such as the present position 39 of the automobile, distance 51 to the target destination point, the arrow 52 indicating the azimuth from the present position 39 of the automobile to the target destination point and the arrow 53 to go at or near the target destination point which are generated by the destination information display device 10 and displayed by the displaying means 9 are displayed on the displaying means 6 at the same time. These guide information items are generated by the destination information display device 10 and transmitted to the displaying means through the drawing means 7. As a result, in the steps ST205 and ST221, in the steps ST205 and ST223, and in the steps ST205 and ST225, these guide information items generated by the destination information display device 10 are displayed on the displaying means 6. Then, these guide information items are erased from the displaying means 6 in the steps ST222, ST224 and ST226 shown in FIGS. 19, 21 and 25.

As described above in detail, in the navigation system of the embodiment 8, because the guide information such as the distance 51 to the target destination point and the azimuth 52 toward the target destination point and the running direction mark 53 as the guide information at or near the target destination point are provided to the driver as a rough and effective guide information by the displaying means 6 in easy or simple form (arrow form) for recognition, there is an effect that the driver can know the rough and effective guide information for the target destination point without any pushing or touching of the display mark "GUIDE" designated by the reference numeral 38 displayed on the displaying means 6 when the driver requires no detailed guide information.

It will be appreciated from the foregoing description that, according to the first aspect of the present invention, the navigation apparatus is constructed to comprise a map information storing means for storing map information, a present position detecting means for specifying an automobile position (or a car position) on the map information by detecting a signal such as a GPS signal, a gyroscopic signal and a speed pulse signal, a map information retrieving means for retrieving a point to be guided from the map information on a basis of the present position, a guide information processing means for producing guide information concerning the point to be guided by processing the map information stored in the map information storing means, a displaying means for displaying the guide information concerning the point to be guided, and an inputting means for inputting various inputs including an input for the guide information in response to a driver's request, and consequently, the navigation apparatus has an advantage that it can display the guide information concerning a requested point in response to a request of a driver.

Furthermore, according to the second aspect of the present invention, the navigation apparatus is constructed to comprise a route setting means for determining a travel route to a destination input with an inputting means, and a map information retrieving means retrieves guide information concerning points to be guided along a route determined by the route setting means from map information stored in a map information storing means, and consequently, the navigation apparatus has an advantage that it can output the guide information concerning the necessary points along the route.

Furthermore, according to the third aspect of the present invention, the navigation apparatus is constructed to comprise a map information storing means for storing map information, a present position detecting means for specifying an automobile position (or a car position) on the map information by detecting a signal such as a GPS signal, a gyroscopic signal and a speed pulse signal, a map information retrieving means for retrieving a point to be guided from the map information on a basis of a present position, a guide information processing means for producing guide information concerning an intersection at a point to be guided which an automobile will pass through when it travels along its present route by processing the map information stored in the map information storing means, a displaying means for displaying the guide information concerning the intersection at the point to be guided, and an inputting means for inputting various inputs including an input for the guide information in response to a driver's request, the navigation apparatus has an advantage that it can output the guide information concerning the intersection at a necessary point in response to a driver's request.

Furthermore, according to the fourth aspect of the present invention, the navigation apparatus is constructed to comprise a voice outputting means for outputting guide information by means of a voice as voice guide information, and a guide information processing means for executing a process so that the voice outputting means outputs voice guide information related to displayed guide information simultaneously with the display thereof, and consequently, the navigation apparatus has an advantage that it can make a driver recognize the guide information by means of his hearing sense, too, and thereby a driver's trouble for recognizing guide information can be decreased because he primary uses his visual sensation during driving.

Furthermore, according to the fifth aspect of the present invention, the navigation apparatus is constructed to store map information described by means of network information expressing at least relationships of road connection by links and nodes in a map information storing means, and consequently the navigation apparatus has an advantage that it can suppress the amount of information to be stored in the map information storing apparatus.

Moreover, according to the sixth aspect of the present invention, because the navigation apparatus has the destination information display device for generating guide information from the present position of an automobile to the target destination point and at or near the target destination point and for providing them to the displaying means 6, there is an effect that a driver of the automobile can recognize the rough and effective guide information items such as a distance to the target destination point, an azimuth toward the target destination point and a running direction to go at or near the target destination point when the driver requires no detailed guide information.

While preferred embodiments of the present invention have been described using specific terms, such description is for illustrative purposes only, and it is to be understood that changes and variations may be made without departing from the spirit or scope of the following claims.

What is claimed is:

1. A navigation apparatus for a vehicle, comprising:
    a map information storing means for storing map information,
    a present position detecting means for specifying a present position of a vehicle on a map indicated by the map information,
    a voice outputting means, for outputting voice information,
    a map information retrieving means for determining a point to be guided that is ahead of said present position by retrieving the map information on a basis of a present position,
    a guide information processing means for producing guide information concerning the point to be guided by processing map information stored in the map information storing means and outputting said guide information to be displayed responsive to a request of a vehicle passenger, said request being specifically for guide information about said point to be guided, thereby allowing said vehicle passenger to request and receive additional information about said point to be guided while approaching said point to be guided, said guide information processing means also for outputting voice guide information to the voice outputting means, said voice guide information corresponding to the outputted guide information, and a drawing means for drawing a map around the present position of the vehicle or said guide information outputted from said guide information processing means.

2. A navigation apparatus according to claim 1, further comprising a route setting means for determining a travel route to a target destination for the vehicle, wherein the map information retrieving means determines the point to be guided on the route determined by the route setting means.

3. A navigation apparatus according to claim 1, wherein the map information retrieving means determines an intersection, as the point to be guided, where the vehicle will meet if the vehicle travels along its present route.

4. A navigation apparatus according to claim 1, wherein the map information storing means stores network information in which links and nodes express relationships of roads connected to each other, and the guide information processing means generates graphic information as the guide information on a basis of the network information.

5. A navigation apparatus according to claim 1, wherein the map information retrieving means obtains relationships of roads regarding the point to be guided expressed by links and nodes from the map information stored in the map information storing means and generates an intersection map data relative to the point to be guided, and the guide information processing means generates an intersection map relative to the point to be guided, as the guide information, based on said intersection map data relative to the point to be guided.

6. A navigation apparatus according to claim 1 further comprising target destination guide information displaying means for generating rough guide information relating to the present position of the vehicle and around the point to be guided based on the guide information provided from the guide information processing means.

7. A navigation apparatus according to claim 6, wherein the target destination guide information displaying means generates information relating to at least one of a distance from the present position of the vehicle to the point to be guided, a direction to the point to be guided from the present position of the vehicle and running direction of the vehicle, as the rough guide information.

8. A navigation apparatus for a vehicle comprising:

a storage device operable to store map information;

a present position detector for detecting the present position of said vehicle;

a present direction detector operable to determine the direction that said vehicle is pointing;

a future point detector for determining a point ahead of said vehicle based on said detected position and direction;

a processor operable to receive information from said storage device, said present position detector, said present direction detector, and said future point detector, and output guidance information based on said present position, said present direction and said future points to a vehicle operator; and an input mechanism operable to allow a vehicle passenger to input a request for additional information regarding a specific future point while approaching said future point, wherein said request causes said apparatus to output additional information regarding said specific future point.

9. A navigation apparatus according to claim 8, wherein said information regarding said future point is in a higher level of detail than the level of detail for said present position.

10. A navigation apparatus according to claim 8, wherein said information regarding said future point includes the existence of a landmark other than road information.

11. A navigation apparatus according to claim 8, further comprising:

a display for displaying a visual representation of map information.

12. A navigation apparatus according to claim 11, further comprising a controller for causing said display to output a visual representation of map information in the vicinity of said present position and a visual representation of said vehicle in a first mode, and causing said display to output a visual representation of information regarding said future point in a second mode, said second mode being activated by said request and lasting for a predetermined time before reverting back to said first mode.

13. A navigation apparatus according to claim 11, wherein a guide button appears on said display when information of a future point is available and disappears when information of a future point is not available.

14. A navigation apparatus according to claim 10, wherein said landmark is a building.

15. A navigation apparatus according to claim 8, wherein said present direction detector includes a compass.

16. A navigation apparatus according to claim 8, wherein said present direction detector includes a processor that determines said present direction by comparing multiple instantiations of said detected present position.

17. A navigation apparatus according to claim 1, further comprising a touch screen mechanism which allows the user to input requests related to specific points to be guided by touching the screen at the location of a specific point to be guided.

18. A navigation apparatus according to claim 8, wherein said input mechanism includes a touch screen system which allows the user to input said request for additional information regarding a specific future point by touching the touch screen in the vicinity of said specific future point.

* * * * *